(12) United States Patent
Akagawa

(10) Patent No.: US 11,703,749 B2
(45) Date of Patent: Jul. 18, 2023

(54) LIGHT SOURCE APPARATUS, ILLUMINATOR, AND PROJECTOR

(71) Applicant: SEIKO EPSON CORPORATION, Tokyo (JP)

(72) Inventor: Tomoko Akagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/953,447

(22) Filed: Sep. 27, 2022

(65) Prior Publication Data

US 2023/0096815 A1 Mar. 30, 2023

(30) Foreign Application Priority Data

Sep. 28, 2021 (JP) .................... 2021-158401

(51) Int. Cl.
*G03B 21/20* (2006.01)
*G02B 27/28* (2006.01)

(52) U.S. Cl.
CPC ......... *G03B 21/204* (2013.01); *G02B 27/283* (2013.01); *G03B 21/208* (2013.01); *G03B 21/2053* (2013.01); *G03B 21/2066* (2013.01)

(58) Field of Classification Search
CPC .............. G02B 27/283; G03B 21/2066; G03B 21/2053
See application file for complete search history.

(56) References Cited

U.S. PATENT DOCUMENTS

| 10,133,169 | B2* | 11/2018 | Kawasumi | G02B 27/141 |
| 2009/0052189 | A1* | 2/2009 | Kon | F21S 41/12 362/296.01 |
| 2012/0140183 | A1 | 6/2012 | Tanaka et al. | |
| 2012/0236264 | A1 | 9/2012 | Akiyama | |
| 2014/0168614 | A1* | 6/2014 | Matsubara | G02B 27/141 353/31 |
| 2017/0153538 | A1 | 6/2017 | Kawasumi | |
| 2018/0059523 | A1* | 3/2018 | Takagi | G03B 33/12 |
| 2018/0239232 | A1* | 8/2018 | Yasumatsu | G03B 21/2066 |
| 2019/0371971 | A1 | 12/2019 | Kozuru et al. | |

(Continued)

FOREIGN PATENT DOCUMENTS

| JP | H09-105898 A | 4/1997 |
| JP | 2012-137744 A | 7/2012 |
| JP | 2012-195064 A | 10/2012 |

(Continued)

*Primary Examiner* — William N Harris
(74) *Attorney, Agent, or Firm* — Oliff PLC

(57) ABSTRACT

A light source apparatus includes a first light source that includes a plurality of first light emitters arranged in a row along a first direction and emits a first luminous flux, a second light source that includes a plurality of second light emitters arranged in a row along a second direction and emits a second luminous flux in a direction in which the first luminous flux is emitted, and a combiner that combines the first and second luminous fluxes with each other to produce combined light and outputs the combined light to an irradiated region. The combined light has a combined light intensity distribution in which a first region where a light intensity of the first luminous flux is maximized and a second region where a light intensity of the second luminous flux is maximized do not overlap with each other.

19 Claims, 14 Drawing Sheets

(56) References Cited

U.S. PATENT DOCUMENTS

2021/0063857 A1 3/2021 Akiyama
2021/0294196 A1 9/2021 Uehara

FOREIGN PATENT DOCUMENTS

| | | |
|---|---|---|
| JP | 2017-97310 A | 6/2017 |
| JP | 2017-215496 A | 12/2017 |
| JP | 2019-212752 A | 12/2019 |
| JP | 2021-33165 A | 3/2021 |
| JP | 2021-150255 A | 9/2021 |

* cited by examiner

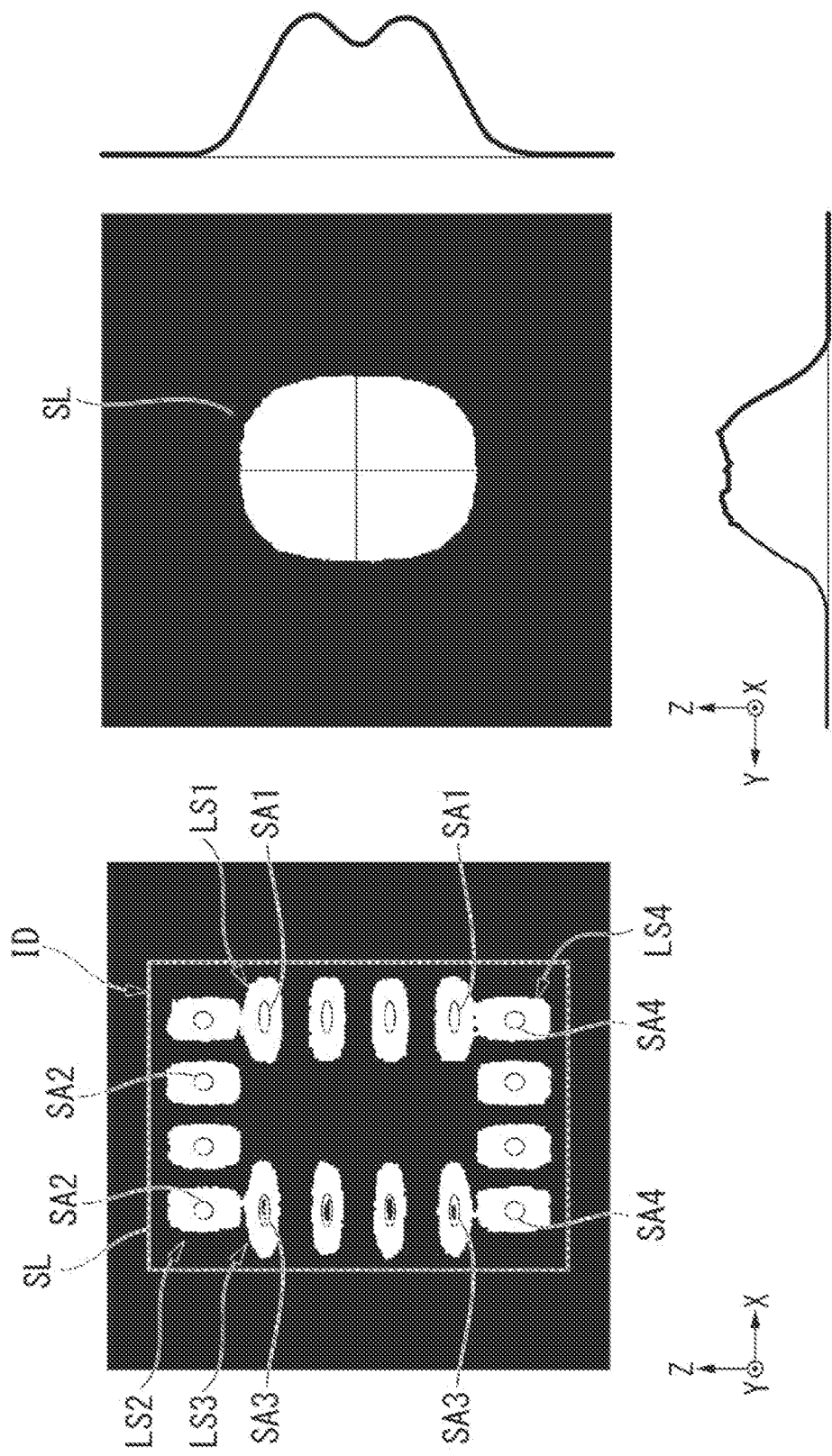

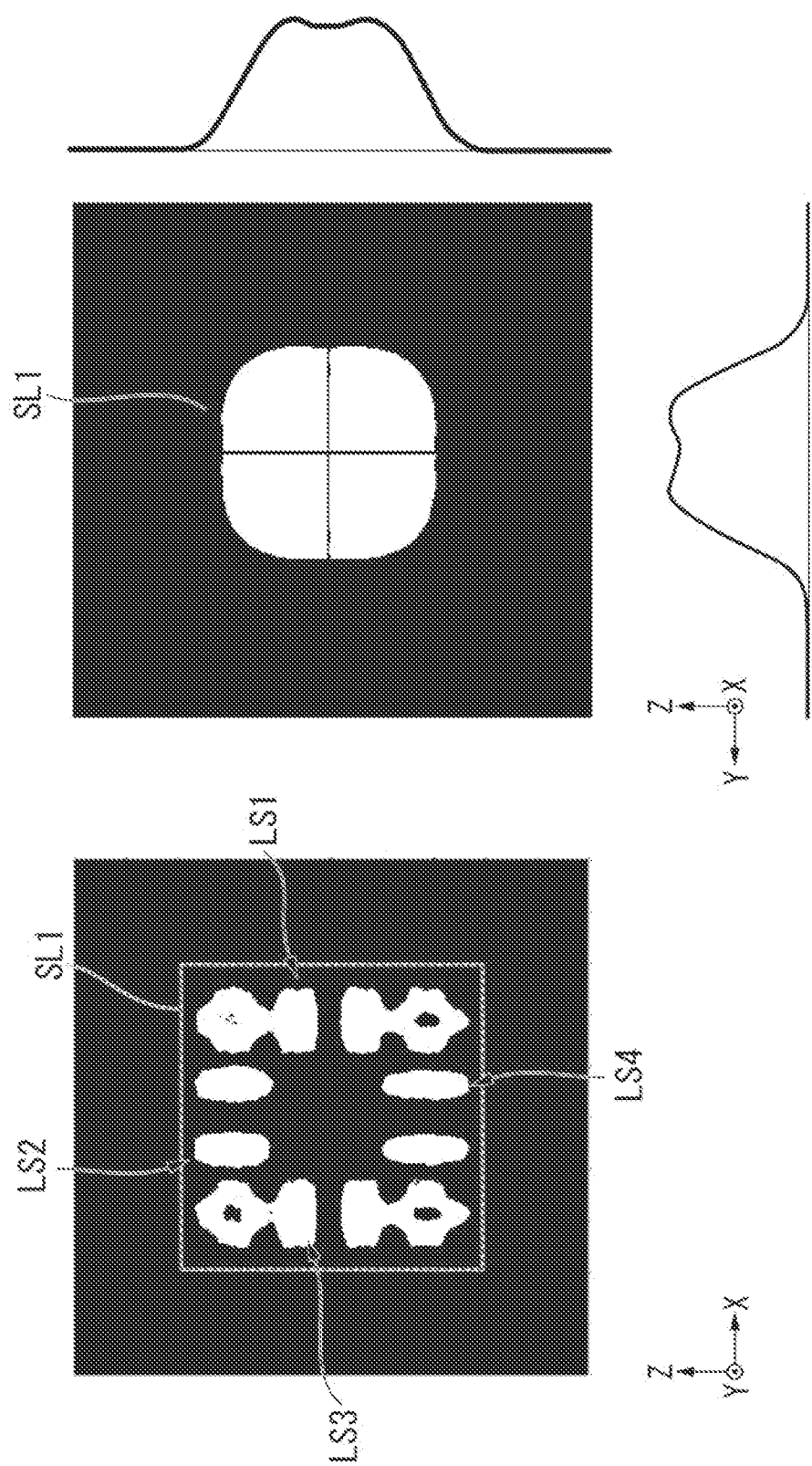

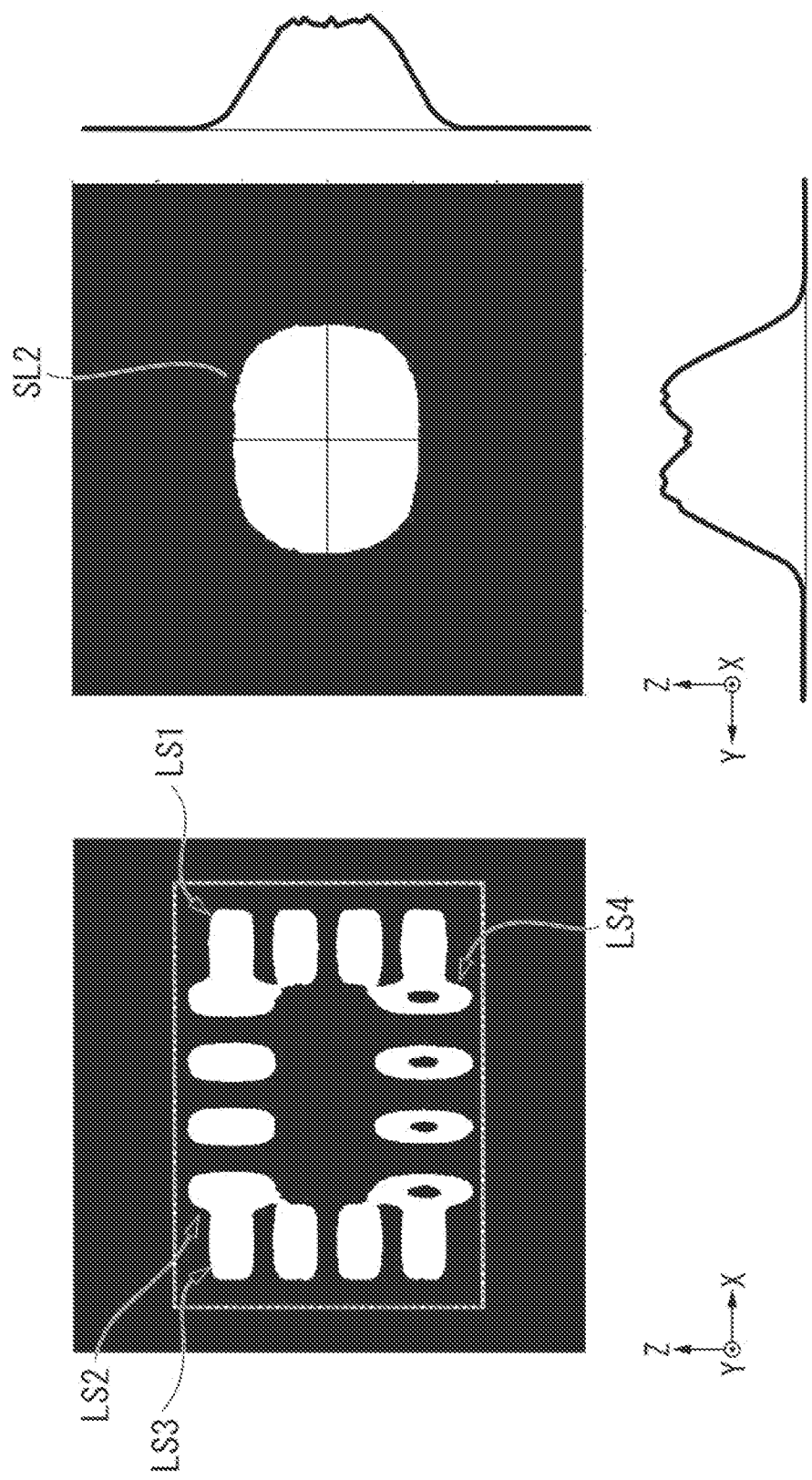

LIGHT SOURCE APPARATUS, ILLUMINATOR, AND PROJECTOR

The present application is based on, and claim priority from JP Application Serial Number 2021-158401, filed Sep. 28, 2021, the disclosure of which is hereby incorporated by reference herein in its entirety.

BACKGROUND

1. Technical Field

The present disclosure relates to a light source apparatus, an illuminator, and a projector.

2. Related Art

There has been a light source apparatus that outputs combined light, which is a combination of beams outputted from a plurality of solid-state light sources and combined by an afocal system, to an irradiated region (see JP-A-2012-137744, for example). There has been another light source apparatus using a light source unit having a one-dimensional arrangement in which a plurality of semiconductor lasers are arranged in a row (see JP-A-2019-212752, for example).

For example, when the combined light, which is a combination of pencils of light from a light source apparatus, which is a combination of a plurality of light source units each having the one-dimensional arrangement described above, is outputted to the irradiated region, the light intensity distribution in the irradiated region have too high optical intensities, which may cause a risk of a load on the irradiated region.

SUMMARY

To solve the problem described above, a light source apparatus according to an aspect of the present disclosure includes a first light source that includes a plurality of first light emitters arranged in a row along a first direction and emits a first luminous flux, a second light source that includes a plurality of second light emitters arranged in a row along a second direction and emits a second luminous flux in a direction in which the first luminous flux is emitted, and a combiner that combines the first luminous flux and the second luminous flux with each other to produce combined light and outputs the combined light to an irradiated region. The combined light has a combined light intensity distribution in which a first region where a light intensity of the first luminous flux is maximized and a second region where a light intensity of the second luminous flux is maximized do not overlap with each other.

An illuminator according to another aspect of the present disclosure includes the light source apparatus described above and a wavelength converter that is disposed in the irradiated region irradiated with the combined light from the light source apparatus and converts a wavelength of the combined light.

A projector according to still another aspect of the present disclosure includes the illuminator described above, a light modulator that modulates light outputted from the illuminator, and a projection optical apparatus that projects the light modulated by the light modulator.

BRIEF DESCRIPTION OF THE DRAWINGS

FIG. 7 shows the combined light intensity distribution of the combined light.

FIG. 8A shows the combined light intensity distribution of combined light in Comparative Example 1.

FIG. 8B shows the combined light intensity distribution of combined light in comparative Example 2.

DESCRIPTION OF EXEMPLARY EMBODIMENTS

Embodiments of the present disclosure will be described below with reference to the drawings.

A projector according to the embodiments of the present disclosure is an example of a projector using a liquid crystal panel as a light modulator.

In the following drawings, components are drawn at different dimensional scales in some cases for clarification of each or the components.

First Embodiment

Figure 1:
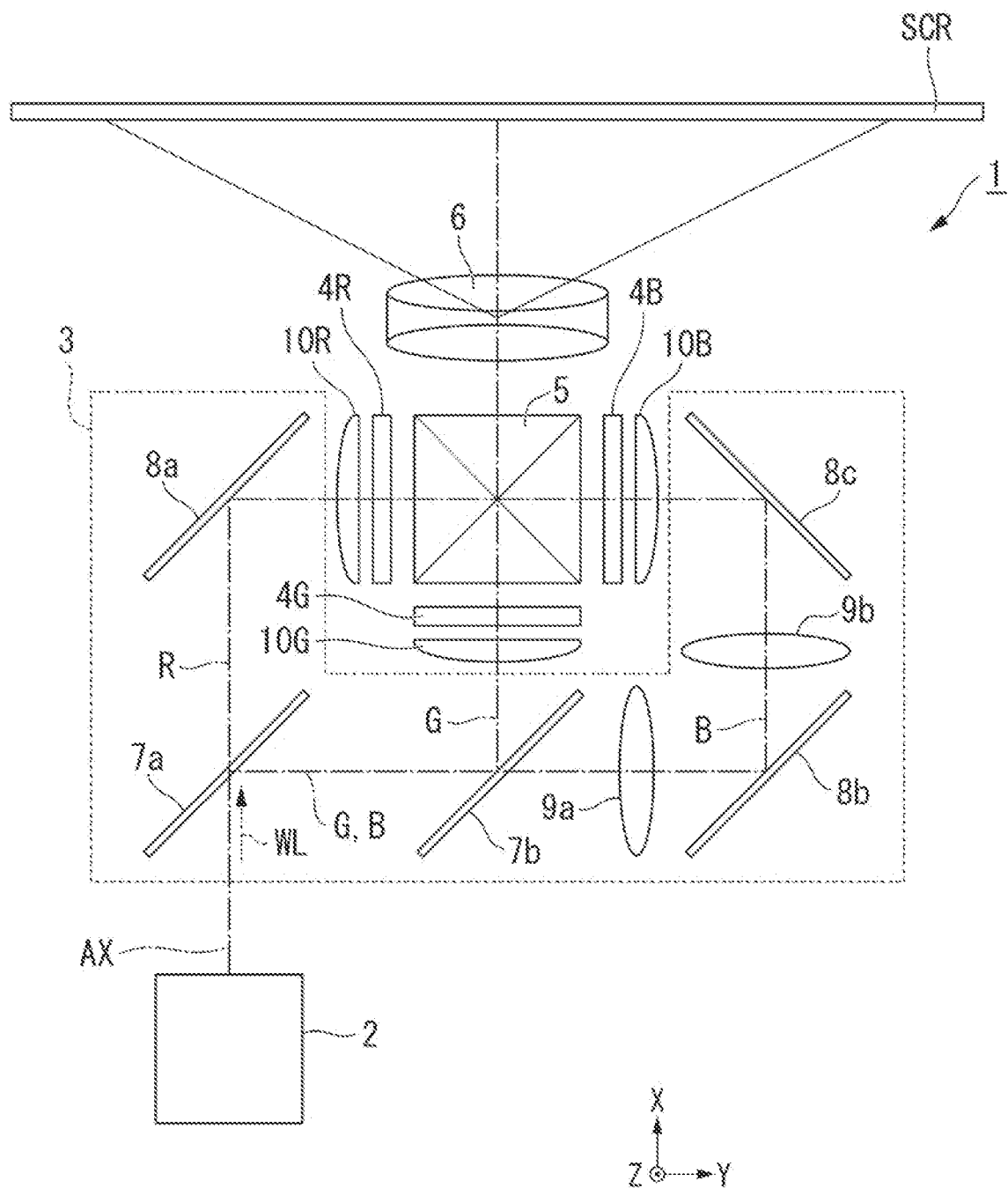
FIG. 1 shows the configuration of a projector according to a first embodiment.

FIG. 1 shows the configuration of the projector according to the present embodiment.

A projector 1 according to the present embodiment shown in FIG. 1 is a projection-type image display apparatus that displays a color image on a screen SCR. The projector 1 uses three light modulators corresponding to red light R, green light G, and blue light B.

The projector 1 includes an illuminator 2, a color separation system 3, light modulators 4R, 4G, and 4B, a light combining system 5, and a projection optical apparatus 6.

The illuminator 2 outputs white illumination light WL toward the color separation system 3. The color separation system 3 separates the white illumination light WL into the red light R, the green light G, and the blue light B. The color separation system 3 includes a first dichroic mirror 7a, a second dichroic mirror 7b, a first reflection mirror 8a, a second reflection mirror 8b, a third reflection mirror 8c, a first relay lens 9a, and a second relay lens 9b.

The first dichroic mirror separates the illumination light WL from the illuminator 2 into the red light R and the other light (green light G and blue light B). The first dichroic mirror 7a transmits the separated red light R and reflects the separated other light (green light G and blue light B). On the other hand, the second dichroic mirror 7b separates the other light into the green light G and the blue light B. The second dichroic mirror 7b reflects the separated green light G and transmits the separated blue light B.

The first reflection mirror 8a is disposed in the optical path of the red light R and reflects the red light R having passed through the first dichroic mirror 7a toward the light modulator 4R. On the other hand, the second reflection mirror 8b and the third reflection mirror 8c are disposed in the optical path of the blue light and reflect the blue light B having passed through the second dichroic mirror 7b toward the light modulator 4B. The green light G is reflected off the second dichroic mirror 7b toward the light modulator 4G.

The first relay lens 9a is disposed in the optical path of the blue light B between the second dichroic mirror 7b and the second reflection mirror 8b. The second relay lens 9b is disposed in the optical path of the blue light B between the second reflection mirror 8b and the third reflection mirror 8c. The first relay lens 9a and the second relay lens 9b correct a difference in the illumination distribution of the blue light B resulting from the fact that the optical path length of the blue light B is longer than the optical path lengths of the red light R and the green light G.

The light modulator 4R modulates the red light R in accordance with image information to form image light corresponding to the red light R. The light modulator 4G modulates the green light G in accordance with image information to form image light corresponding to the green light G. The light modulator 4B modulates the blue light B in accordance with image information to form image light corresponding to the blue light B.

The light modulators 4R, 4G, and 4B are each, for example, a transmissive liquid crystal panel. Polarizers (not shown) are disposed on the light incident side and the light exiting side of each of the liquid crystal panels and configured to transmit only linearly polarized light polarized in a specific direction.

Field lenses 10R, 10G, and 10B are disposed on the light incident side of the light modulators 4R, 4G, and 4B, respectively. The field lenses 10R, 10G, and 10B parallelize the principal rays of the red light R, the green light G, and the blue light B to be incident on the respective light modulators 4R, 4G, and 4B.

The light combining system 5 receives the image light outputted from the light modulator 4R, the image light outputted from the light modulator 4G, and the image light outputted from the light modulator 4B, combines the image light corresponding to the red light R, the image light corresponding to the green light G, and the image light corresponding to the blue light B with one another, and outputs the combined image light toward the projection optical apparatus 6. The light combining system 5 is, for example, a cross dichroic prism.

The projection optical apparatus 6 is formed of a plurality of projection lenses. The projection optical apparatus 6 magnifies the combined image light from the light combining system 5 and projects the magnified image light toward the screen SCR. An image is thus displayed on the screen SCR.

An example of the illuminator 2 according to the present embodiment will be described.

Figure 2:
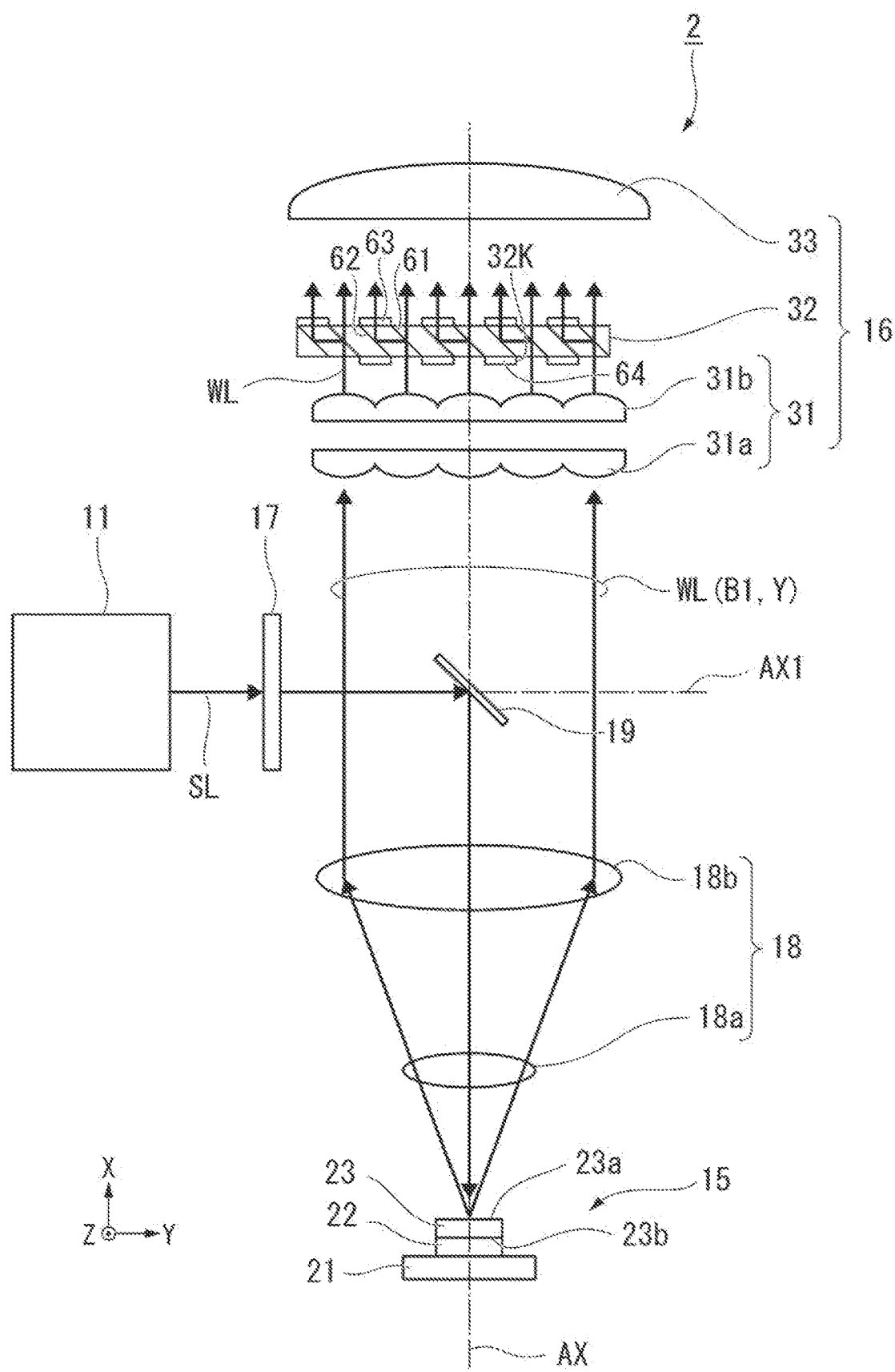
FIG. 2 shows a schematic configuration of an illuminator.

FIG. 2 shows a schematic configuration of the illuminator 2.

The illuminator 2 includes a light source apparatus 11, a diffuser 17, a wavelength converter 15, a homogenizing illumination system 16, a focusing system 18, and a dichroic mirror (reflection member) 19, as shown in FIG. 2.

In the following description, the arrangement of the components of the illuminator 2 and light source apparatus 11 and other factors thereof will be described by using an orthogonal coordinate system XYZ. The directions in the present embodiment are defined as follows: An axis-X direction is the direction along an illumination optical axis AX in the illuminator 2; an axis-Y direction is the direction along a first optical axis AX1 of the light source apparatus 11; and an axis-Z direction is the direction perpendicular to the axes X and Y. The first optical axis AX1 and the illumination optical axis AX are perpendicular to each other.

The light source apparatus 11 and the dichroic mirror 19 are disposed along the first optical axis AX1. The wavelength converter 15, the focusing system 18, the dichroic mirror 19, and the homogenizing illumination system 16 are arranged along the illumination optical axis AX of the illuminator 2.

Combined light SL outputted from the light source apparatus 11 is incident on the dichroic mirror 19 via the diffuser 17. The light source apparatus in the present embodiment, which outputs the combined light SL with the luminous flux width thereof reduced, allows reduction in the size of the dichroic mirror 19, as will be described later.

The diffuser 17, can, for example, be a surface diffuser plate having an irregular structure at a surface of a light transmissive planar plate, a gradient index diffuser plate having a refractive index distribution inside a light transmissive planar plate, a diffractive element, a hologram element, or a meta-lens element. The combined light SL passes through the diffuser 17, resulting in an increase in the uniformity the light intensity distribution at the wavelength converter 15, which is an illuminated region.

In place of the diffuser 17, a convex lens may be provided between the light source apparatus 11 and the dichroic mirror 19 to cause the combined light SL to be incident on the wavelength converter 15, which is the illuminated region, with the combined light SL defocused (out-of-focus) to increase the uniformity of the light intensity distribution at the wavelength converter 15. The convex lens described above may be combined with the diffuser 17.

The dichroic mirror 19 is optically characterized so as to reflect the combined light SL, which belongs to a blue wavelength band, and transmit fluorescence Y, which belongs to an yellow wavelength band and is emitted from the wavelength converter 15, which will be described later. The dichroic mirror 19 is formed, for example, of a dielectric multilayer film. The dichroic mirror 19 may be replaced with a mirror that reflects the combined light SL and the fluorescence Y.

The combined light SL reflected off the dichroic mirror 19 enters the focusing system 18. The focusing system 18 includes convex lenses 18a and 18b, focuses the combined light SL, and causes the focused combined light SL to be incident on the wavelength converter 15.

The wavelength converter 15 includes a substrate 21, a reflection layer 22, and a wavelength conversion layer 23. The substrate 21 is not only a support substrate that supports the reflective layer 22 and the wavelength conversion layer 23 but a heat dissipation substrate that dissipates heat conducted from the wavelength conversion layer 23. The substrate 21 can be made of a material having high thermal conductivity, for example, metal or ceramic.

The reflection layer 22 is located between the substrate 21 and the wavelength conversion layer 23 and reflects light incident from the wavelength conversion layer 23 toward the wavelength conversion layer 23. The reflection layer 22 is formed of a laminated film including a dielectric multilayer film, a metal mirror, an enhanced reflection film, and other films.

The wavelength conversion layer 23 is provided on the reflection layer 22. The wavelength conversion layer 23 has an upper surface 23a, on which the combined light SL is incident, and a lower surface 23b, which differs from the upper surface 23a. The wavelength conversion layer 23 converts the combined light SL, which belongs to the blue wavelength band, into the fluorescence Y, which belongs to a wavelength band different from the blue wavelength band.

The wavelength conversion layer 23 may contain a ceramic phosphor or a single crystal phosphor. The wavelength band to which the fluorescence Y belongs has a peak wavelength ranging, for example, from 500 to 680 nm. That is, the fluorescence Y is yellow light containing a green light component and a red light component.

The wavelength conversion layer 23 contains, for example, an yttrium-aluminum-garnet-based (YAG-based) phosphor. Consider YAG:Ce, which contains cerium (Ce) as an activator, by way of example, and the wavelength conversion layer 23 can be made, for example, of a material produced by mixing raw powder materials containing $Y_2O_3$, $Al_2O_3$, $CeO_3$, and other constituent elements with one another and causing the mixture to undergo a solid-phase reaction, Y—Al—O amorphous particles produced by using a coprecipitation method, a sol-gel method, or any other wet method, or YAG articles produced by using a spray-drying method, a flame-based thermal decomposition method, a thermal plasma method, or any other gas-phase method. When a porous sintered element is used as the wavelength conversion layer 23, light is scattered inside the phosphor so that the light is unlikely to propagate laterally, which is desirable also from the viewpoint of light utilization efficiency.

In the present embodiment, the upper surface 23a of the wavelength conversion layer 23 is provided with a scattering structure (not shown) that scatters part of the combined light SL.

According to the wavelength converter 15 having the configuration described above in the present embodiment, the white illumination light WL, which contains the fluorescence Y generated by the wavelength conversion layer 23 and diffusively reflected light B1 formed of part of the combined light SL diffusively reflected off the upper surface 23a of the wavelength conversion layer 23, is outputted toward the focusing system 18. The illumination light WL is substantially parallelized by the focusing system 18. The illumination light WL having passed through the focusing system 18 passes through the dichroic mirror 19 disposed in the illumination optical axis AX.

The dichroic mirror 19 is optically characterized so as to reflect the combined light SL and transmit the fluorescence Y. The fluorescence Y contained in the illumination light WL therefore passes through the dichroic mirror 19 and travels toward the homogenizing illumination system 16. Since the fluorescence Y passes through the dichroic mirror 19, whereby optical loss of the fluorescence Y due to the dichroic mirror 19 can be reduced.

On the other hand, the diffusively reflected light B1 contained in the illumination light WL belongs to the wavelength band to which the combined light SL belongs, and is therefore reflected off the dichroic mirror 19. In view of the fact described above, in the present embodiment, in which the combined light SL is incident on the dichroic mirror 19 with the luminous flux width of the combined light SL compressed, the size of the dichroic mirror 19 is reduced. The amount of diffusively reflected light B1 incident on the dichroic mirror 19 is therefore suppressed, whereby optical loss of the diffusively reflected light B1 due to the reflection off the dichroic mirror 19 can be reduced.

The illumination light WL outputted from the wavelength converter 15 enters the homogenizing illumination system (illumination system) 16. The homogenizing illumination system 16 includes an optical integration system 31, a polarization converter 32, and a superimposing system 33. The optical integration system 31 includes a first multi-lens array 31a and a second multi-lens array 31b. The polarization converter 32 aligns the polarization directions of the illumination light WL with the direction of the transmission axis of the light-incident-side polarizers for the light modulators 4R, 4G, and 4B.

The polarization directions of the red light R, the green light G, and the blue light B separated from the illumination light WL having passed through the polarization converter 32 thus coincide with the direction of the transmission axis of the light-incident-side polarizers for the light modulators 4R, 4G, and 4B. The red light R, the green light G, and the blue light B are therefore incident on image formation regions of the light modulators 4R, 4G, and 4B, respectively, without being blocked by the light-incident-side polarizers.

The superimposing system 33 along with the second multi-lens array 31b brings images of lenslets of the first multi-lens array 31a into focus in the vicinity of the image formation region of each of the light modulators 4R, 4G, and 4B.

To improve the reliability of the projector 1, it is important to maintain the brightness of the illumination light WL. To maintain the brightness of the illumination light WL, it is effective to prolong the life of the wavelength converter 15 by reducing the load on the wavelength converter 15.

In general, when the light intensity of excitation light incident on a phosphor is too high, the phosphor is deformed or damaged due to the increased load on the phosphor, resulting in a decrease in life of the phosphor. That is, to reduce the load on the phosphor, it is important to increase the uniformity of the intensity distribution of the excitation light so that high-intensity light is not incident on the phosphor.

The light source apparatus 11 according to the present embodiment, which increases the uniformity of the light intensity distribution of the combined light SL to be radiated toward the wavelength converter 15 disposed in the irradiated region, allows reduction in the load on the wavelength conversion layer 23. The configuration of the light source apparatus 11 according to the present embodiment will be described below in detail.

Figure 3:
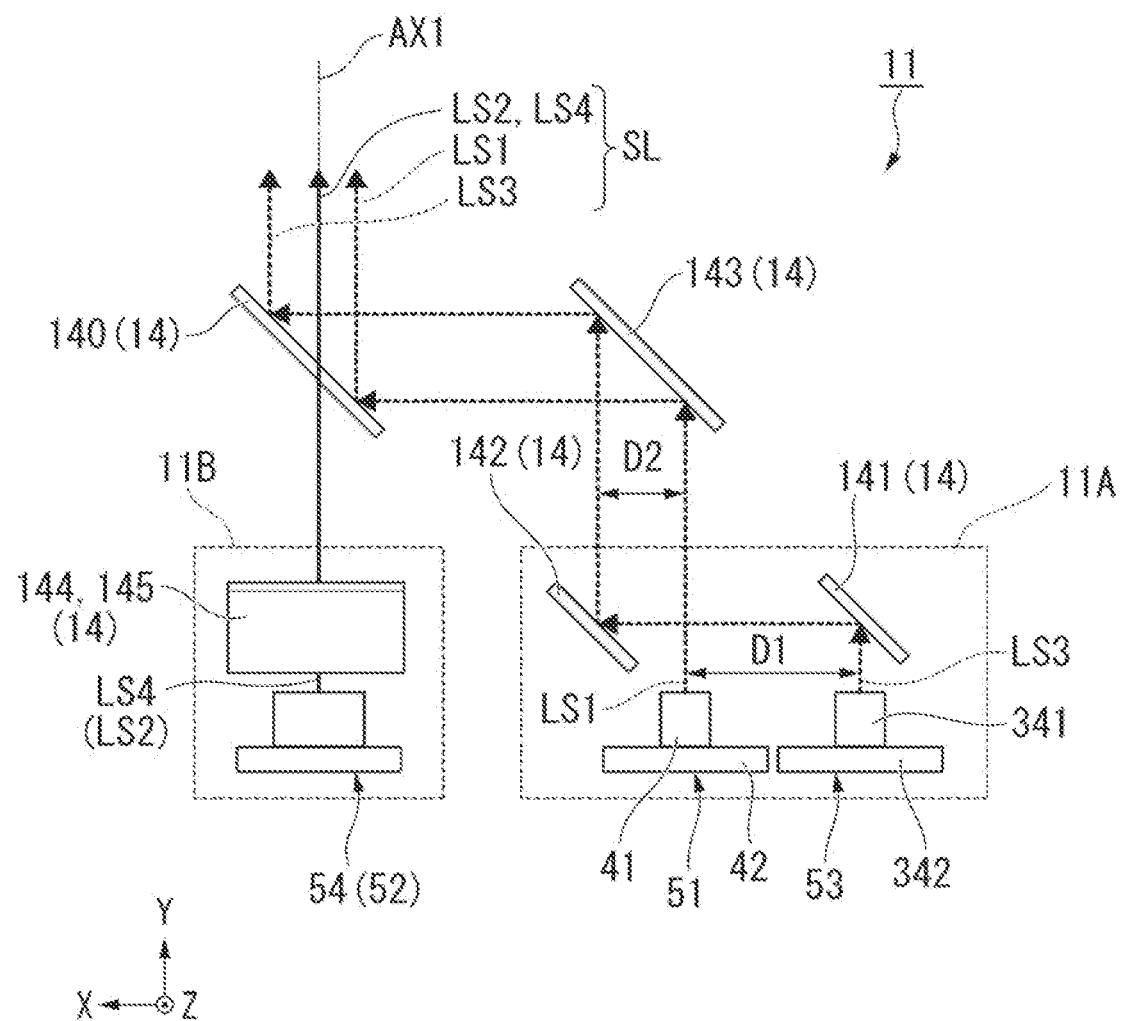
FIG. 3 is a plan view showing the overall configuration of a light source apparatus.

FIG. 3 is a plan view showing the overall configuration of the light source apparatus 11 viewed from the side +Z toward the side −Z.

The light source apparatus 11 according to the present embodiment includes a first light source unit 11A, a second light source unit 11B, and a light combining member 14, as shown in FIG. 3.

The first light source unit 11A includes a first light source section 51 and a third light source section 53. The first light source section 51 outputs a first luminous flux LS1 along the axis-Y direction. The third light source section 53 outputs a third luminous flux 133 along the axis-Y direction.

The second light source unit 11B includes a second light source section 52 and a fourth light source section 54. The second light source section 52 outputs a second luminous flux LS2 along the axis-Y direction. The fourth light source section 54 outputs a fourth luminous flux LS4 along the axis-Y direction.

The light combining member 14 outputs the combined light SL, which is the combination of the first luminous flux LS1 and the third luminous flux LS3 outputted from the first light source unit 11A and the second luminous flux LS2 and the fourth luminous flux LS4 outputted from the second light source unit 11B, to the wavelength conversion layer 23 as the illuminated region.

In the present embodiment, the light combining member 14 includes a polarization combiner (combiner) 140, a reflection mirror (first reflection member) 141, a reflection mirror (second reflection member) 142, a reflection mirror (third reflection member) 143, a reflection mirror (fourth reflection member) 144, and a reflection mirror (fifth reflection member) 145.

In the first light source unit 11A, the first light source section 51 and the third light source section 53 have the same configuration. The configuration will be described below with reference to the first light source section 51 by way of example.

Figure 4:
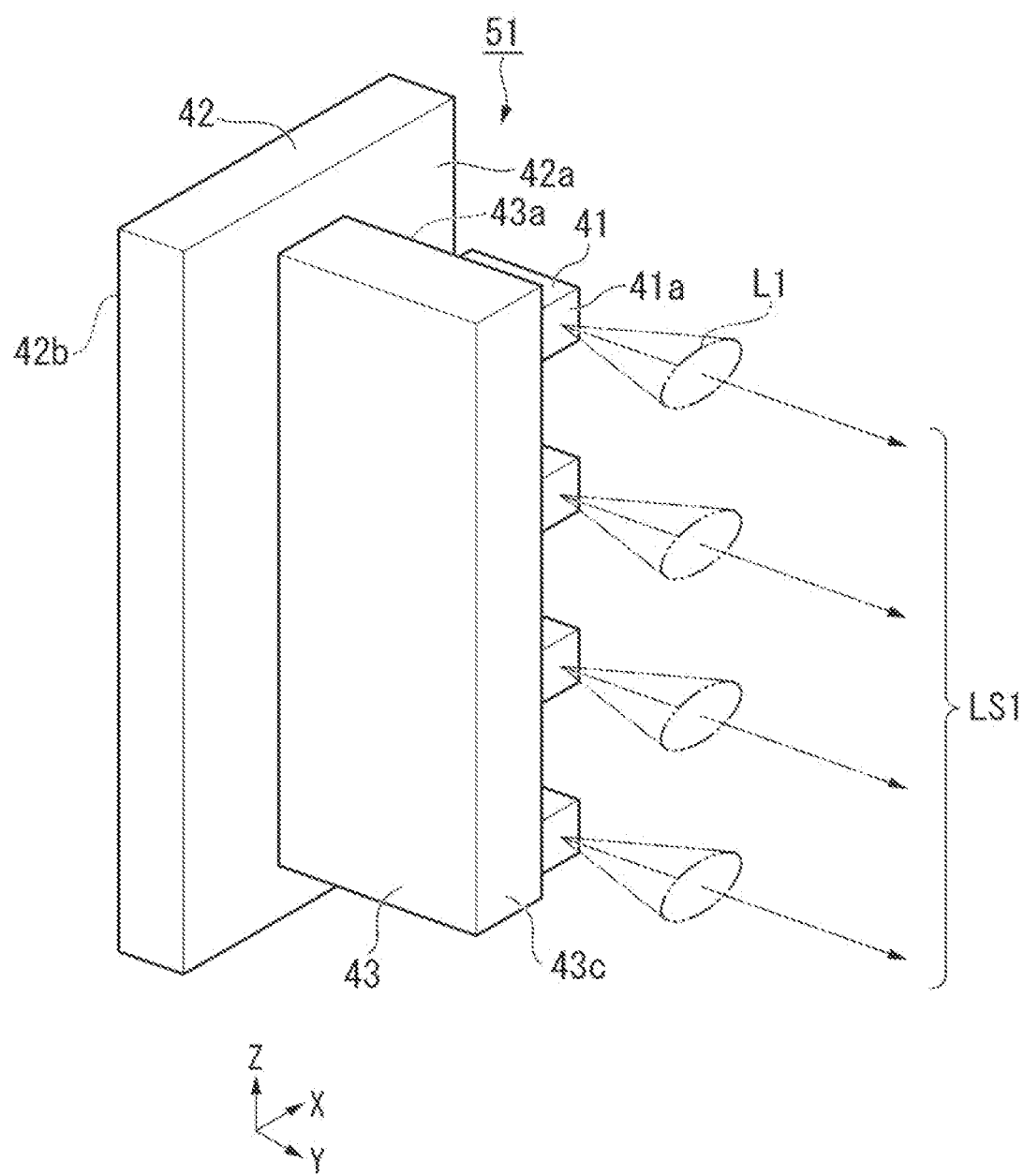
FIG. 4 is a perspective view of a first light source section.

FIG. 4 is a perspective view of the first light source section 51.

The first light source section 51 includes plurality of light emitters (first light emitter) 41, a substrate 42, and a support member 43, as shown in FIG. 4.

The substrate 42 has a first surface 42a and a second surface 42b and is made of a metal material that excels in heat dissipation, for example, aluminum or copper. The support member 43 is provided at the first surface 42a of the substrate 42. The support member 43 is made of a metal material that excels in heat dissipation, for example, aluminum or copper, as the substrate 42 is. The support member 43 has a mounting surface 43a, on which the plurality of light emitters 41 are mounted. The mounting surface 43a has an oblong shape having a lengthwise direction and a widthwise direction when viewed in the direction of a normal to the mounting surface 43a.

The plurality of light emitters 41 are arranged at intervals on the mounting surface 43a of the support member 43 along the lengthwise direction of the mounting surface 43a. The plurality of light emitters 41 are supported by the substrate 42 via the support member 43. In the present embodiment, the first light source section 51 includes the plurality (four in the present embodiment) of light emitters 41 arranged in a row along the axis-Z direction (first direction).

The light emitters 41 are each so mounted on the support member 43 that a rectangular light emitting surface 41a is substantially flush with an long-edge-side end surface 43c of the support member 43. The direction in which a beam L1 outputted from each of the light emitters 41 exits therefore coincides with the widthwise direction of the support member 43. The direction in which the beam L1 exits is the direction along the principal ray of the beam L1.

The direction in which the plurality of light emitters 41 are arranged intersects with the direction in which the beam L1 exits. In the present embodiment, a cross section of the beam L1 outputted from each of the light emitters 41, the cross section perpendicular to the principal ray of the beam L1, has an elliptical shape. The direction of the minor axis of the elliptical shape coincides with the direction in which the plurality of light emitters 41 are arranged (axis-Z direction). The direction of the major axis of the elliptical shape coincides with the axis-X direction. A cross section of the beam L1 outputted from each of the light emitters 41, the cross section perpendicular to the principal ray of the beam L1, does not necessarily have a perfect elliptical shape.

The plurality of light emitters 41 are each formed of a blue semiconductor laser that outputs blue light. The blue semiconductor laser outputs blue light having a peak wavelength that falls within a blue wavelength band ranging from 380 to 495 nm by way of example. The beam L1 outputted from each of the light emitters 41 is parallelized by a collimator lens (not shown) provided in the vicinity of the light emitting surface 41a.

The first light source section 51 therefore outputs a luminous flux containing four blue beams L1 arranged in the axis-Z direction. In the present embodiment, the entire light outputted from the first light source section 51 and containing the four beams L1 is referred to as the first luminous flux LS1.

The first luminous flux LS1 outputted from the first light source section 51 is S-polarized light (light polarized in first direction) with respect to the polarization combiner 140.

The third light source section 53, which has the same configuration as that of the first light source section 51, includes a plurality of light emitters (third light emitters) 341 arranged in the axis-Z direction, and a substrate 342. The light emitters 341 and the substrate 342 have the same configurations as those of the light emitters 41 and the substrate 42 of the first light source section 51.

The third light source section 53 is disposed next to the first light source section 51 in the axis-X direction, which intersects with the axis-Z direction. The substrates 42 of the first light source section 51 and the substrate 342 of the third light source section 53 are disposed in parallel to the plane ZX (predetermined plane). That is, the substrates 42 of the first light source section 51 and the substrate 342 of the third light source section 53 are disposed in the same plane. The first light source section 51 and the third light source section 53 are integrally supported by a support member that is not shown.

In the third light source section 53, a cross section of the light outputted from each of the light emitters 341, the cross section perpendicular to the principal ray of the light, has an elliptical shape. The direction of the minor axis of the elliptical shape coincides with the direction in which the plurality of light emitters 341 are arranged (axis-Z direction).

The third light source section 53 outputs a luminous flux containing four blue beams arranged in the axis-Z direction. In the present embodiment, the entire light outputted from the third light source section 53 and containing the four blue beams is referred to as the third luminous flux LS3.

In the present embodiment, the third luminous flux LS3 outputted from the third light source section 53 is S-polarized light (light polarized in first direction) with respect to the polarization combiner 140, as the first luminous flux LS1 is.

The reflection mirror 141 reflects the third luminous flux LS3 outputted from the third light source section 53 in the axis-X direction, which intersects with the axis-Y direction, which is the direction in which the third luminous flux LS3 is outputted, and the axis-Z direction (first direction). Specifically, the third luminous flux LS3 is reflected off the reflection mirror 141 toward the reflection mirror 142.

The reflection mirror 142 reflects the third luminous flux LS3 reflected off reflection mirror 141 the axis-Y direction, which is the direction in which the first luminous flux LS1 outputted from the first light source section 51 is outputted. In the present embodiment, the reflection mirror 141 is disposed in a position shifted toward the side-X from the first light source section 51. The reflection mirrors 141 and 142 are each formed, for example, of a plate-shaped member provided with a film formed of a metal film or a dielectric multilayer film.

The first luminous flux LS1 outputted from the first light source section 51 is incident directly on the reflection mirror 143. The reflection mirror 143 is formed, for example, of a plate-shaped member provided with a film formed of a metal film or a dielectric multilayer film. The third luminous flux LS3 reflected off the reflection mirror 142 is incident on the reflection mirror 143. That is, the third luminous flux LS3 reflected off the reflection mirror 142 and the first luminous flux LS1 outputted from the first light source section 51 are incident on the reflection mirror 143.

The reflection mirror 143 reflects the first luminous flux LS1 and the third luminous flux LS3 toward the polarization combiner 140. The first luminous flux LS1 and the third luminous flux LS3 reflected off the reflection mirror 143 are incident on the polarization combiner 140 in the axis-X direction.

It is now assumed that the spacing in the direction along the direction between the first luminous flux LS1 and the third luminous flux LS3 before the luminous fluxes are incident on the reflection mirrors 141 and 142 is called a first spacing D1, and the spacing in the direction along the direction X between the first luminous flux LS1 and the third luminous flux LS3 after the luminous fluxes are incident on the reflection mirrors 141 and 142 is called a second spacing D2.

In the light source apparatus 11 according to the present embodiment, the reflection mirrors 141 and 142 are so disposed that the spacing between the first luminous flux LS1 and the third luminous flux LS3 changes as follows: The second spacing D2 after the incidence on the reflection mirrors 141 and 142 is narrower than the first spacing D1 before the incidence.

Specifically, the third luminous flux LS3 reflected off the reflection mirror 141 intersects with the first luminous flux LS1 outputted from the first light source section 51 and is then reflected off the reflection mirror 142. The reflection mirror 142 is located so as to cause the second spacing D2 described above to be narrower than the first spacing D1 described above.

The first luminous flux LS1 and the third luminous flux LS3 are incident on the polarization combiner 140 with the spacing between the two luminous fluxes narrowed in the axis-X direction. In the light source apparatus 11 according to the present embodiment, the size of the polarization combiner 140 can be reduced in the axis-X direction.

The polarization combiner 140 is formed of an optical element having a polarization separation function for blue light. The polarization separation function of the polarization combiner 140 causes the polarization combiner 140 to transmit the P-polarized component of the blue light and reflect the S-polarized component thereof. In the present embodiment, the first luminous flux LS1 outputted from the first light source section 51 and the third luminous flux LS3 reflected off the reflection mirror 142 are incident as S-polarized light on the polarization combiner 140. The first luminous flux LS1 and the third luminous flux LS3 are therefore reflected off the polarization combiner 140 and exit in the axis-Y direction.

Figure 5:
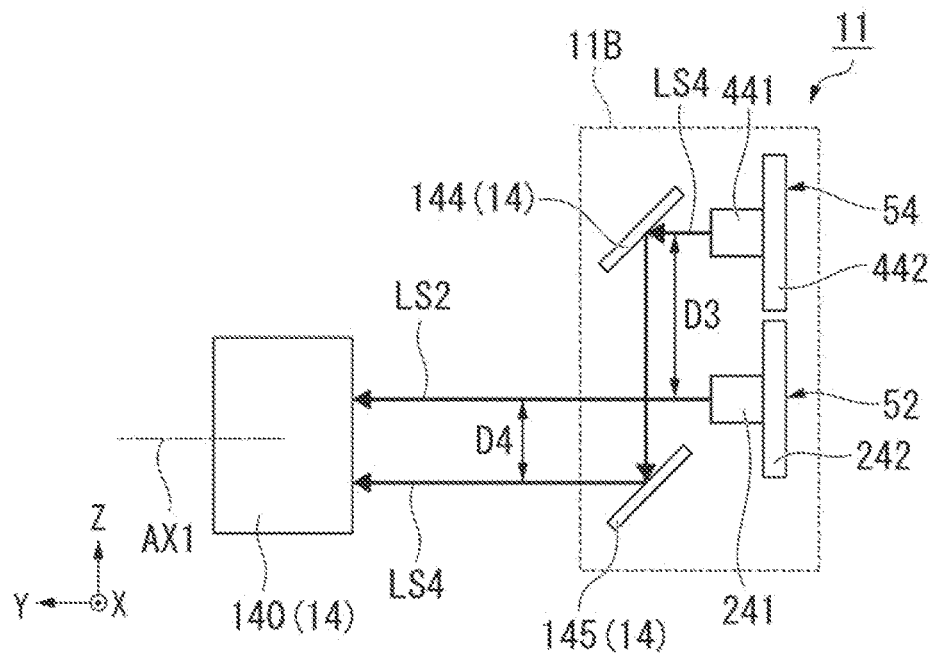
FIG. 5 shows the configuration of a second light source unit.

The configuration of the second light source unit 11B will be subsequently described. FIG. 5 shows the configuration of the second light source unit 11B, and is a plan view of the second light source unit 11B viewed from the side +X toward the side −X.

The second light source unit 11B includes the second light source section 52 and the fourth light source section 54, as shown in FIG. 5. The second light source section 52 outputs the second luminous flux LS2 in the axis-Y direction. The fourth light source section 54 outputs the fourth luminous flux LS4 in the axis-Y direction.

The second source section 52 and the fourth light source section 54 have the same configuration as that of the first light source section 51 and are arranged side by side in the axis-Z direction.

The second light source section 52 includes a plurality of light emitters (second light emitters) 241, which are sequentially arranged in a row along the axis-X direction (second direction), and a substrate 242. The light emitters 241 and the substrate 242 have the same configurations as those of the light emitters 41 and the substrate 42 of the first light source section 51.

That is, the axis-X direction (second direction), which is the direction in which the plural of light emitters 241 in the second light source section 52 are arranged, intersects with (is perpendicular to) the axis-Z direction (first direction), which is the direction in which the plurality of light emitters 241 in the first light source section 51 and the plurality of light emitters 341 in the third light source section 53 are arranged.

A cross section of the light outputted from each of the light emitters 241 of the second light source section 52, the cross section perpendicular to the principal ray of the light, has an elliptical shape. The direction of the minor axis of the elliptical shape coincides with the direction in which the plurality of light emitters 241 are arranged (axis-X direction). The second light source section 52 outputs a luminous flux containing four blue beams arranged in the axis-X direction. In the present embodiment, the entire light containing the four blue beams outputted from the second light source section 52 is referred to as the second luminous flux LS2.

The fourth light source section 54 is disposed in a position shifted from the second light source section 52 in the axis-Z direction, which intersects with the axis-X direction (second direction). The fourth light source section 54 includes a plurality of light emitters 441, which are sequentially arranged in a row along the axis-X direction, and a substrate 442, as the second light source section 52 does. The light emitters 441 and the substrate 442 have the same configurations as those of the light emitters 41 and the substrate 42 of the first light source section 51.

That is, the axis-X direction (second direction), which is the direction in which the plurality of light emitters 441 in the fourth light source section 54 are arranged, intersects with (is perpendicular to) the axis-Z direction (first direction), which is the direction in which the plurality of light emitters 41 in the first light source section 51 and the plurality of light emitters 241 in the second light source section 52 are arranged.

A cross section of the light outputted from each of the light emitters 441 of the fourth light source section 54, the cross section perpendicular to the principal ray of the light, has an elliptical shape. The direction of the minor axis of the elliptical shape coincides with the direction in which the plurality of light emitters 441 are arranged (axis-X direction). The fourth light source section 54 outputs a luminous flux containing four blue beams arranged in the axis-X direction. In the present embodiment, the entire light containing the four blue beams outputted from the fourth light source section 54 is referred to as the fourth luminous flux LS4. The fourth light source section 54 outputs the fourth luminous flux LS4 in the direction in which the second luminous flux LS2 is outputted from the second light source section 52.

In the present embodiment, the substrate 242 of the second light source section 52 and the substrate 442 of the fourth light source section 54 are disposed in parallel to the plane ZX (predetermined plane).

Therefore, in the light source apparatus 11 according to the present embodiment, the substrate 42 of the first light source section 51, the substrate 242 of the second light source section 52, the substrate 342 of the third source section 53, and the substrate 442 of the fourth light source section 54 are disposed in the same plane. Therefore, for example, cooling air can be supplied in one direction to each of the substrates 42, 242, 342, and 442. The first light source section 51, the second light source section 52, the light source section 53, and the fourth light source section 54 are therefore readily cooled.

In the present embodiment, the second luminous flux LS2 outputted from the second light source section 52 and the fourth luminous flux LS4 outputted from the fourth light source section 54 are each P-polarized light (light polarized in second direction) with respect to the polarization combiner 140.

The reflection mirror 144 reflects the fourth luminous flux LS4 outputted from the fourth light source section 54 in the axis-Z direction, which intersects with the axis-Y direction, which is the direction in which the fourth luminous flux LS4 is outputted, and the axis-X direction (second direction). Specifically, the fourth luminous flux LS4 is reflected off the reflection mirror 144 toward the reflection mirror 145.

The reflection mirror 145 reflects the fourth luminous flux LS4 reflected off reflection mirror 144 in the axis-f direction, which is the direction in which the second luminous flux LS2 outputted from the second light source section 52 is outputted. The reflection mirrors 144 and 145 are each formed, for example, of a plate-shaped member provided with a film formed of a metal film or a dielectric multilayer film.

The second luminous flux LS2 outputted from the second light source section 52 directly enters the polarization combiner 140. The fourth luminous flux LS4 reflected off the reflection mirror 145 enters the polarization combiner 140. That is, the fourth luminous flux LS4 reflected off the reflection mirror 145 and the second luminous flux LS2 outputted from the second light source section 52 enter the polarization combiner 140.

It is now assumed that the spacing in the direction along the direction Z between the second luminous flux LS2 and the fourth luminous flux LS4 before the luminous fluxes are incident on the reflection mirrors 144 and 145 is called a third spacing D3 and the spacing in the direction along the direction Z between the second luminous flux LS2 and the fourth luminous flux LS4 after the luminous fluxes are incident on the reflection mirrors 144 and 145 is called a fourth spacing D4.

In the light source apparatus 11 according to the present embodiment, the reflection mirrors 144 and 145 reflect the second luminous flux LS2 and the fourth luminous flux LS4 in such a way that the spacing between the second luminous flux LS2 and the fourth luminous flux LS4 after the incidence on the reflection mirrors 144 and 145 is narrower than the spacing before the incidence. Specifically, the fourth luminous flux LS4 reflected off the reflection mirror 144 intersects with the second luminous flux LS2 outputted from the second light source section 52 and is then reflected off the reflection mirror 145. The reflection mirror 145 is located so as to cause the fourth spacing D4 described above to be narrower than the third spacing D3 described above.

The second luminous flux LS2 and the fourth luminous flux LS4 enter the polarization combiner 140 with the spacing between the two luminous fluxes narrowed in the axis-Z direction. Therefore, in the light source apparatus 11 according to the present embodiment, the size of the polarization combiner 140 can be reduced in the axis-Z direction.

In the present embodiment, the second luminous flux LS2 outputted from the second light source section 52 and the fourth luminous flux LS4 reflected off the reflection mirror 145 enter the polarization combiner 140 as P-polarized light. The second luminous flux LS2 and the fourth luminous flux LS4 therefore pass through the polarization combiner 140 and exit in the axis-Y direction.

The polarization combiner 140 thus produces the combined light SL, which is the combination of the first luminous flux LS1, the second luminous flux LS2, the third luminous flux LS3, and the fourth luminous flux LS4.

Figure 6:
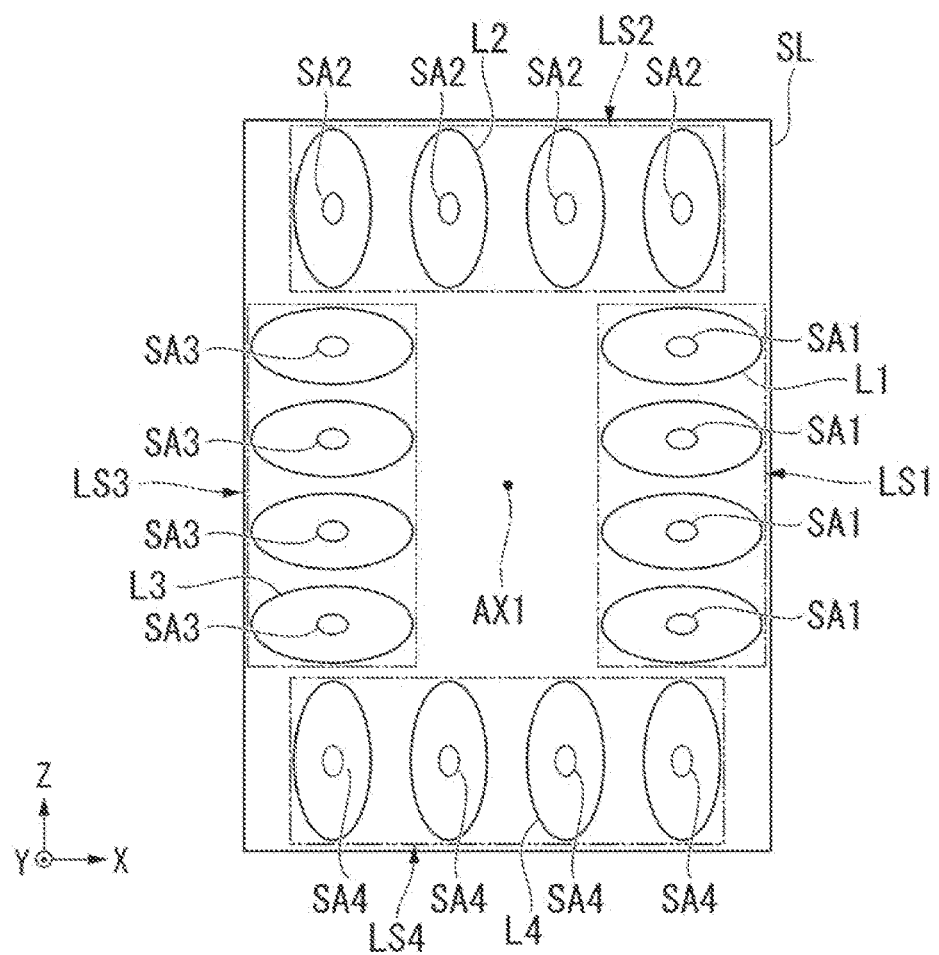
FIG. 6 conceptually shows combined light.

FIG. 6 conceptually shows the combined light SL as a result of the combination performed by polarization combiner 140. FIG. 6 is a plan view of the combined light SL after outputted from the polarization combiner 140 but before entering the diffuser 17, and viewed from the side +Y toward the side −Y. FIG. 7 shows the combined light intensity distribution of the combined light SL. FIG. 7 shows the illuminance distribution of the combined light SL at the upper surface 23a of the wavelength conversion layer 23. FIG. 7 further shows changes in the illuminance of the combined light SL in the axis-Y and axis-Z directions.

The four beams L1, which form the first luminous flux LS1, are arranged along the axis-Z direction (first direction), and four beams L3, which form the third luminous flux LS3, are arranged along the axis-Z direction, as shown in FIG. 6. A cross section of each of the beams L1 and L3, the cross section perpendicular to the principal ray thereof, has an elliptical shape, and the direction of the minor axis of the elliptical shape of each of the beams L1 and L3 coincides with the axis-Z direction.

Four beams L2, which form the second luminous flux LS2, are arranged along the axis-X direction (second direction), and four beams L4, which form the fourth luminous flux LS4, are arranged along the axis-X direction. A cross section of each of the beams L2 and L4, the cross section perpendicular to the principal ray thereof, has an elliptical shape, and the direction of the minor axis of the elliptical shape of each of the beams L2 and L4 coincides with the axis-X direction.

In the combined light SL in the present embodiment, the first luminous flux LS1 and the third luminous flux LS3 are located between the second luminous flux LS2 and the fourth luminous flux LS4 in the axis-Z direction.

The direction in which the beams L1 and L3 are arranged in the first luminous flux LS1 and the third luminous flux LS3 (axis-Z direction) and the direction in which the beams L2 and L4 are arranged in the second luminous flux LS2 and the fourth luminous flux LS4 (axis-X direction) differ from each other by 90 degrees in the circumferential direction around the first optical axis AX1 of the light source apparatus 11. Therefore in the combined light SL, the beams L1, L2, L3, and L4 are arranged around the first optical axis AX1. The combined light SL in the present embodiment has a rectangular shape having a longitudinal dimension in the axis-Z direction. The shape of the combined light SL is defined by an imaginary line that connects the outer shapes of the beams located at the outermost edge of the beams that form the combined light SL.

The combined light SL has a combined light intensity distribution ID, which is the combination of the light intensity distributions of the luminous fluxes LS1, LS2, LS3, and LS4, as shown in FIG. 7.

The intensity distribution corresponding to the first luminous flux LS1 in the combined light intensity distribution ID includes high intensity regions (first region) SA1 having the highest light intensity.

The beams L1, which form the first luminous flux LS1, each have a central region where the light intensity is maximized. That is, the high intensity regions SA1 in the first luminous flux LS1 each correspond to the region which is located in a central portion of each of the beams L1 and where the light intensity is maximized, as shown in FIG. 6.

The intensity distribution corresponding to the second luminous flux LS2 in the combined light intensity distribution ID has high intensity regions (second region) SA2 having the highest light intensity, as the first luminous flux LS1 does. The high intensity regions SA2 in the second luminous flux LS2 each correspond to the region which is located in a central portion of each of the beams L2, which form the second luminous flux LS2, and where the light intensity is maximized, as shown in FIG. 6.

The intensity distribution corresponding to the third luminous flux LS3 in the combined light intensity distribution ID includes high intensity regions (third region) SA3 having the highest light intensity. The high intensity regions SA3 in the third luminous flux LS3 each correspond to the region which is located in a central portion of each of the beams L3, which form the third luminous flux LS3, and where the light intensity is maximized, as shown in FIG. 6.

The intensity distribution corresponding to the fourth luminous flux LS4 in the combined light intensity distribution ID includes high intensity regions (fourth region) SA4 having the highest light intensity. The high intensity regions SA4 in the fourth luminous flux LS4 each correspond to the region which is located in a central portion of each of the beams L4, which form the fourth luminous flux LS4, and where the light intensity is maximized, as shown in FIG. 6.

In the combined light SL, the high intensity regions SA1 of the first luminous flux LS1, the high intensity regions SA2 of the second luminous flux LS2, the high intensity regions SA3 of the third luminous flux LS3, and the high intensity regions SA4 of the fourth luminous flux LS4 do not overlap with each other, as shown in FIG. 6.

That is, the combined light SL in the present embodiment has the combined light intensity distribution ID, in which the high intensity regions SA1, SA2, SA3, and SA4 of the luminous fluxes LS1, LS2, LS3, and LS4 do not overlap with each other.

The light source apparatus 11 according to the present embodiment, in which the second light source section 52 and the fourth light source section 54, which along with the reflection mirrors 144 and 145 form the second light source unit 11B, are located in adjusted positions as shown in FIG. 3, can produce the combined light SL having the combined light intensity distribution ID, in which the high intensity regions SA1, SA2, SA3, and SA4 do not overlap with each other, as shown in FIG. 7.

An effect of the combined light SL in the present embodiment will now be described while compared with an effect of combined light in Comparative Examples.

FIG. 8A shows the combined light intensity distribution of combined light SL1 in Comparative Example 1. FIG. 8B shows the combined light intensity distribution of combined light SL2 in Comparative Example 2. The combined light SL in Comparative Example 1 differs from the combined light SL in the present embodiment in that portions of the high intensity regions SA1, SA2, SA3, and SA4 overlap with each other. The combined light SL2 in Comparative Example 2 is a horizontally elongated light as a result of swapping the lengthwise and widthwise directions of the combined light SL in the present embodiment.

FIGS. 8A and 8B show the illuminance distribution of the combined light SL1 and SL2 at the upper surface 23a of the wavelength conversion layer 23, respectively. FIGS. 8A and 8B further show changes in the illuminance of the combined light SL1 and SL2 in the axis-Y and axis-Z directions.

Figure 9:
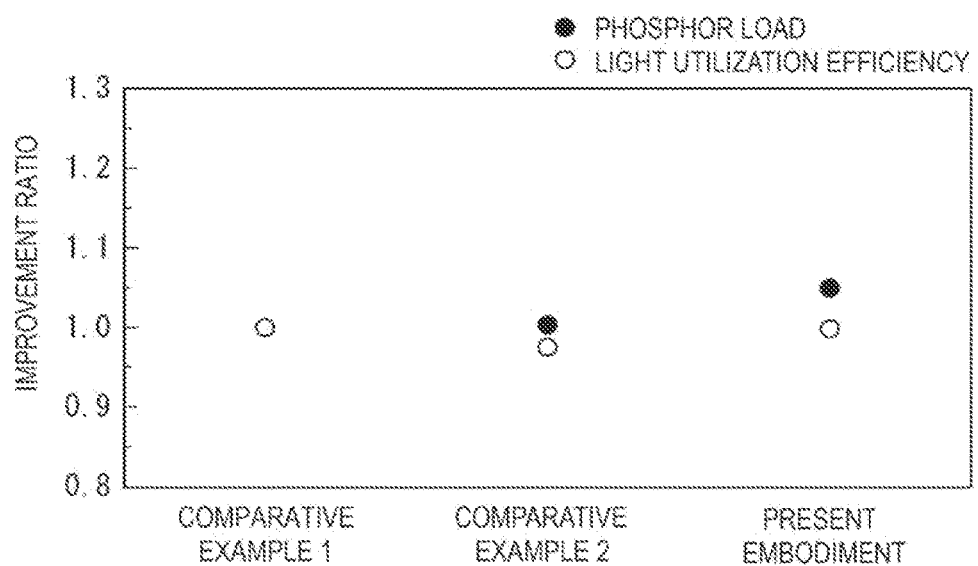
FIG. 9 shows comparison among the effects of a variety of types of combined light.

FIG. 9 shows graphs illustrating the effect of the combined light SL in the present embodiment and the effects of the combined light in Comparative Examples 1 and 2 with which the wavelength converter 15 is irradiated. Specifically, FIG. 9 shows a phosphor load acting on the wavelength conversion layer 23 when the wavelength conversion layer 23 is irradiated with the combined light SL, SL1, and SL2, and light utilization efficiency representing how efficiently fluorescence Y, which is emitted from the wavelength conversion layer 23 when irradiated with the combined light SL, SL1, and SL2, is utilized.

It is assumed in FIG. 9 that the combined light SL1 in Comparative Example 1 provides reference phosphor load and light utilization efficiency of (1.0), and FIG. 9 shows an "improvement ratio", which represent a change in the phosphor load and the light utilization efficiency, that is, the ratio of the phosphor load and the light utilization efficiency provided by the combined light SL and SL2 to those provided by the combined light SL in Comparative Example 1. That is, an improvement ratio of 1.0 means that the phosphor load or the light utilization efficiency is equal to that provided by the combined light SL1 in Comparative Example 1, an improvement ratio smaller than 1.0 means that the phosphor load or the light utilization efficiency is worsened as compared with that provided by the combined light SL1 in Comparative Example 1, and an improvement ratio greater than 1.0 means that the phosphor load or the light utilization efficiency is improved as compared with that provided by the combined light SL1 in Comparative Example 1.

The combined light SL1 in Comparative Example 1 has a substantially square shape, as shown in FIG. 8A. That is, the beams that form the combined SL1 in Comparative Example 1 and are located at the four corners of the combined light SL1 undesirably overlap with each other because the distance between the second luminous flux LS2 and the fourth luminous flux LS4 is shorter than that in the combined light SL in the present embodiment shown in FIGS. 6 and 7. Therefore, in the combined light SL1 in Comparative Example 1, portions of the high intensity regions SA1, SA2, SA3, and SA4 overlap with each other. The uniformity of the combined light intensity distribution of the combined light SL1 is therefore lower than that of the combined light SL in the present embodiment.

The combined light SL2 in Comparative Example 2 has a horizontally elongated rectangular shape, as shown in FIG. 8B. That is, the combined light SL2 in Comparative Example 2 differs from the combined light SL in the present embodiment shown in FIG. 6 in that the luminous fluxes LS1 and LS3 are farther from each other in the axis-X direction, and that the luminous fluxes LS2 and LS4 are closer to the first optical axis AX1 and placed between the luminous fluxes LS1 and LS3 in the axis-X direction. It is noted that the combined light SL2 in Comparative Example 2 and the combined light SL in the present embodiment, when compared with each other, have short edges having the same length but long edges having different lengths, that is, the long edges of the combined light SL are longer than the long edges of the combined light SL2. Therefore, in the combined light SL2 in Comparative Example 2, portions of the high intensity regions SA1, SA2, SA3, and SA4 slightly overlap with each other.

Since the combined light SL2 in Comparative Example 2 has a rectangular shape, the size of the radiation spot formed on the wavelength conversion layer 23 by the combined light SL2 is larger than that formed by the combined light SL1 in Comparative Example 1. The combined light SL2, which forms a larger radiation spot, seems to reduce the phosphor load on the wavelength conversion layer 23 because the optical density of the combined light SL2 is suppressed as compared with that of the combined light SL1 in Comparative Example 1.

However, the combined light SL2 in Comparative Example 2, which has low uniformity of the light intensity distribution because portions of the high intensity regions SA1, SA2, SA3, and SA4 overlap with each other as described above, cannot provide the effect of reducing the load on the wavelength conversion layer 23 that should be achieved by the larger radiation spot. As a result, it is ascertained that the combined light SL2 in Comparative Example 2 provides the same phosphor load improvement ratio as that provided in Comparative Example 1, as shown in FIG. 9.

In contrast, according to the combined light SL in the present embodiment, the high intensity regions SA1, SA2, SA3, and SA4 of the luminous fluxes LS1, LS2, LS3, and LS4 do not overlap with each other in the combined light intensity distribution ID, whereby the uniformity of the combined light intensity distribution ID of the combined light SL can be increased. It is therefore ascertained that the combined light SL in the present embodiment allows reduction in the phosphor load on the wavelength conversion layer 23 as compared with the combined light SL1 in Comparative Example 1 and the combined light SL2 in Comparative Example 2, as shown in FIG. 9.

The present inventor has also focused on the fact that the light utilization efficiency associated with the fluorescence Y emitted from the wavelength conversion layer 23 changes in accordance with the shape of each of the combined light SL, SL1, and SL2.

The behavior described above results from the fact that the amount of fluorescence that passes through the homogenizing illumination system 16 and can be effectively used as the image light changes in accordance with the shape of each of the radiation spots of the combined light SL, SL1, and SL2 formed on the wavelength conversion layer 23.

The polarization converter (optical element) 32 in the present embodiment includes a plurality of polarization separation layers 61, a plurality of reflection layers 62, a plurality of retardation layers 63, and a light blocking film 64, as shown in FIG. 2. The retardation layers 63 are provided on the light exiting side of the polarization converter 32. The polarization converter 32 has a plurality of light incident openings 32K, through which the illumination light WL outputted from the wavelength conversion layer 23 passes. The light incident openings 32K are each formed of an opening formed in the light blocking film 64 disposed on the light incident side of the polarization converter 32. The light incident openings 32K each have a rectangular planar shape having a longitudinal dimension in the axis-Z direction. The aspect ratio of each of the light incident openings 32K between the length in the axis-Y direction and the length in the axis-Z direction is, for example, 1:1.3.

In the light source apparatus 11 according to the present embodiment, a secondary light source image of the fluorescence Y emitted from the wavelength conversion layer is formed in the vicinity of the light incident openings 32K, more specifically, between the light exiting surface of the second multi-lens array 31b and the light incident openings 32K.

The phosphor load on the wavelength conversion layer 23 can be reduced by enlarging the radiation spot of the combined light SL on the wavelength conversion layer 23 to suppress the optical density of the combined light SL, as described above.

On the other hand, when the radiation spot of the combined light SL on the wavelength conversion layer 23 is enlarged so that the light exiting area of the wavelength conversion layer 23 via which the fluorescence Y exits increases, resulting in a decrease in the light utilization efficiency representing how efficiently the homogenizing illumination system 16 utilizes the fluorescence Y. The reason for this is that when the exiting area via which the fluorescence Y exits increases, the secondary light source image of the fluorescence Y formed in the vicinity of the light incident openings 32K enlarges, resulting in a decrease in the amount of fluorescence Y passing through the light incident openings 32K and hence a decrease in the light utilization efficiency representing how efficiently the homogenizing illumination system 16 utilizes the fluorescence Y. That is, enlarging the radiation spot of the combined light SL to further increase the effect of reducing the phosphor load on the wavelength conversion layer 23 results in a decrease in the light utilization efficiency associated with the fluorescence Y. It is therefore difficult to achieve both the reduction in the phosphor load on the wavelength conversion layer 23 and the improvement in the light utilization efficiency associated with the fluorescence Y.

For example, the combined light SL2 in Comparative Example 2 has an elongated shape unlike the shape of the combined light SL1 in Comparative Example 1, and the size of the radiation spot of the combined light SL2, which is the excitation light, on the wavelength conversion layer 23 is greater than that of the combined light SL1 in Comparative Example 1. Therefore, since the combined light SL2 in Comparative Example 2 forms a light exiting region, via which the fluorescence Y exits, larger than that formed by the combined light SL1 in Comparative Example 1, the secondary light source image of the fluorescence Y formed in the vicinity of the light incident openings 32K enlarges, resulting in a decrease in the amount of fluorescence Y passing through the light incident openings 32K. It can therefore be ascertained that the light utilization efficiency associated with the combined light SL2 in Comparative Example 2 is lower than that associated with the combined light SL1 in Comparative Example 1, as shown in FIG. 9.

The shape of the combined light SL2 in Comparative Example 2 has a horizontally elongated shape different from that of the combined light SL in the present embodiment and is therefore not similar to the shape of the light incident openings 32K. Therefore, the secondary light source image of the fluorescence Y emitted from the wavelength conversion layer 23 excited by the combined light SL2 in Comparative Example 2 is not similar in shape to the light incident openings 32K, so that part of the fluorescence Y is likely to extend off the light incident openings 32K, and the fluorescence Y cannot efficiently pass through the light incident openings 32K. It can therefore be ascertained that the light utilization efficiency associated with the combined light SL2 in Comparative Example 2 is lower than that associated with the combined light SL in the present embodiment, as shown in FIG. 9.

In contrast, in the light source apparatus 11 according to the present embodiment, the light combining member 14 produces the combined light SL in such a way that the shape of the combined light SL, which defines the size of the radiation spot of the excitation light on the wavelength conversion layer 23, corresponds to the shape of the light incident openings 32K. That is, the light source apparatus 11 according to the present embodiment is so configured that the shape of the combined light SL is maximized with the shape of the combined light SL being similar to the shape of the light incident openings 32K.

In the present embodiment, the aspect ratio of the combined light SL is so set that the aspect ratio of the light combining member 14 is equal to that of the light incident openings 32K (1:1.3).

The shape of the light exiting region of the wavelength conversion layer 23, via which the fluorescence Y exits, is substantially similar to the shape of the radiation spot of the combined light SL. That is, the secondary light source image of the fluorescence Y formed in the vicinity of the light incident openings 32K is substantially similar to the shape of the radiation spot of the combined light SL. When the shape of the combined light SL is similar to the shape of the light incident openings 32K as described above, it can be said that the secondary source image of the fluorescence Y is substantially similar to the shape of the light incident openings 32K.

In the present embodiment, since the combined light SL is similar in shape to the light incident openings 32K, the fluorescence Y emitted from the wavelength conversion layer 23 can form a secondary light source image substantially similar to the light incident openings 32K in the vicinity thereof.

Therefore, in the illuminator 2 according to the present embodiment, the fluorescence emitted from the wavelength conversion layer 23 is unlikely to extend off the light incident openings 32K, whereby the fluorescence Y efficiently passes through the light incident opening 32K. It can therefore be ascertained that the light utilization efficiency associated with the combined light SL in the present embodiment is greatly improved as compared with those associated with the combined light SL1 and SL2 in Comparable Examples 1 and 2, as shown in FIG. 9.

In the present embodiment, the aspect ratio of the combined light SL is set at 1:1.3, and now consider a hypothetical case where the aspect ratio is set at 1:1.2, that is, a case where the combined SL has a vertically elongated rectangular shape but does not fully correspond to the shape of the light incident openings 32K.

In the hypothetical case where the aspect ratio of the combined SL is set at 1:1.2, the radiation spot of the combined light SL formed on the wavelength conversion layer 23 is larger than that of the combined light SL1 in Comparative Example 1. The optical density of the combined light SL is therefore lower than that of the combined light SL1 in Comparative Example 1, whereby the effect of reducing the phosphor load on the wavelength conversion layer 23 is achieved.

On the other hand, since the secondary source image of the fluorescence Y is not similar to the light incident openings 32K, the fluorescence Y is likely to extend off the light incident openings 32K, resulting in a decrease in the light utilization efficiency representing how efficiently the fluorescence Y is utilized as compared with the light utilization efficiency associated with the combined light SL1 in Comparative Example 1. Therefore, when the shape of the combined light SL does not sufficiently correspond to the shape of the light incident openings 32K (when aspect ratio is set at 1:1.2), both the reduction in the phosphor load and the improvement in the light utilization efficiency provided by the combined light SL1 in Comparative Example 1 cannot be sufficiently improved.

As described above, the light source apparatus 11 according to the present embodiment which allows reduction in the phosphor load on the wavelength conversion layer 23, allows suppression of deformation of and damage to the wavelength conversion layer 23. The life of the wavelength conversion layer 23 can thus be prolonged, whereby a highly reliable light source apparatus that maintains the brightness of the illumination light WL for a long period can be provided.

The light source apparatus 11 according to the present embodiment, in which the shape of the combined light SL corresponds to the shape of the light incident openings 32K of the polarization converter 32, allows increase in the amount of fluorescence Y passing through the polarization converter 32. The light source apparatus 11 according to the present embodiment can therefore be a value-added light source apparatus that provides improved light utilization efficiency associated with the fluorescence Y with the phosphor load on the wavelength conversion layer 23 reduced.

The illuminator 2 according to the present embodiment, which includes the light source apparatus 11 described above, which allows an increase in the light utilization efficiency associated with the illumination light WL containing fluorescence Y, can produce bright illumination light WL.

In the light source apparatus 11 according to the present embodiment, in which the light combining member 14 reflects the third luminous flux LS3 in such a way that the optical path of the third luminous flux LS3 approaches the optical path of the first luminous flux LS1, allows a decrease in the distance between the first luminous flux LS1 and the third luminous flux LS3. The light combining member 14 further reflects the fourth luminous flux LS4 in such a way that the optical path of the fourth luminous flux LS4 approaches the optical path of the second luminous flux LS2, allows a decrease in the distance between the second luminous flux LS2 and the fourth luminous flux LS4. The luminous fluxes LS1, LS2, LS3, and LS4 can thus be combined with one another into the combined light SL having a reduced luminous flux width. The dichroic mirror 19 disposed in the optical path of the illumination light WL can therefore be reduced in size. Optical loss due to the dichroic mirror 19 is thus reduced, whereby an illuminator 2 having high light utilization efficiency can be provided.

The projector 1 according to the present embodiment, which includes the illuminator 2, which provides increased light usage efficiency associated with the illumination light WL, can be a projector that operates at high optical efficiency and displays a bright image.

Second Embodiment

An illuminator according to a second embodiment will be subsequently described. The illuminator according to the present embodiment differs from the illuminator 2 according to the first embodiment in terms of the configuration of the light source apparatus. The configuration of the light source apparatus will be primarily described below. It is noted that members common to those in the first embodiment have the same reference characters and will not be described in detail.

Figure 10:
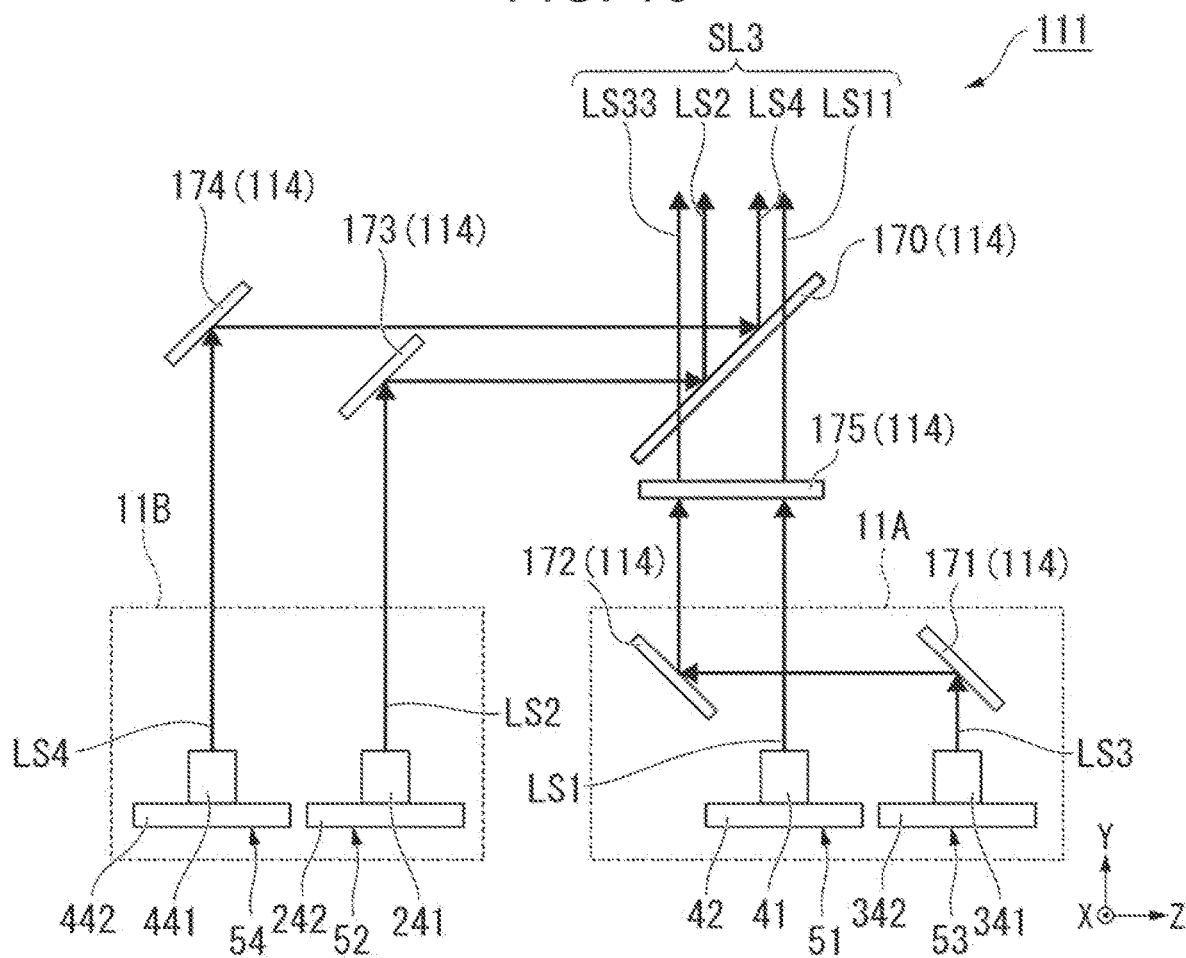
FIG. 10 is a plan view showing the overall configuration of a light source apparatus according to a second embodiment.

FIG. 10 is a plan view showing the overall configuration of a light source apparatus 111 according to the present embodiment viewed from the side +X toward the side −X.

The light source apparatus 111 according to the present embodiment includes the first light source unit 11A, the second light source unit 11B and a light combining member 114, as shown in FIG. 10. In the present embodiment, the first light source unit 11A is disposed in a position shifted toward the side +Z from the second light source unit 11B.

The light combining member 114 outputs combined light SL3, which is the combination of the first luminous flux LS1 and the third luminous flux LS3 outputted from the first light source unit 11A and the second luminous flux LS2 and the fourth luminous flux LS4 outputted from the second light source unit 11B.

In the present embodiment, the light combining member 114 includes a polarization combiner 170, a reflection mirror (first reflection member) 171, a reflection mirror (second reflection member) 172, a reflection mirror (third reflection member) 173, a reflection mirror (fourth reflection member) 174, and a phase retarder 175.

In the present embodiment, the first light source section 51 and the third light source section 53 include the light emitters 41 and 341 arranged in the axis-X direction (first direction), and the second light source section 52 and the fourth light source section 54 include the light emitters 241 and 441 arranged in the axis-X direction (second direction). That is, in the present embodiment, the axis-X direction (second direction), which is the direction in which the plurality of light emitters 241 in the second light source section 52 are arranged, is parallel to the axis-X direction (first direction), which is the direction in which the plurality of light emitters 41 in the first light source section 51 and the plurality of light emitters 341 in the third light source section 53 are arranged.

The first luminous flux LS1 outputted from the first light source section 51 and the third luminous flux LS3 outputted from the third light source section 53 are each S-polarized light with respect to the polarization combiner 170.

The reflection mirror 171 reflects the third luminous flux LS3 outputted from the third light source section 53 in the axis-Z direction. Specifically, the third luminous flux LS3 is reflected off the reflection mirror 171 toward the reflection mirror 172. The reflection mirror 172 reflects the third luminous flux LS3 reflected off the reflection mirror 171 in the axis-Y direction, which is the direction in which the first luminous flux LS1 outputted from the first light source section 51 is outputted. The reflection mirrors 171 and 172 are each formed, for example, of a plate-shaped member provided with a film formed of a metal film or a dielectric multilayer film.

The first luminous flux LS1 outputted from the first light source section 51 and the third luminous flux LS3 reflected off the reflection mirror 171 enter the phase retarder 175.

The phase retarder 175 is disposed in the optical path of the first luminous flux LS1 between the first light source section 51 and the polarization combiner 170.

The phase retarder 175 is formed of a half wave plate. The first luminous flux LS1 and the third luminous flux LS3 pass through the phase retarder 175, which rotates the polarization direction of the luminous fluxes by 90 degree, and are therefore converted into a first luminous flux LS11 and a third luminous flux LS33 formed of P-polarized light with respect to the polarization combiner 170.

In the light source apparatus 111 according to the present embodiment, the reflection mirrors 171 and 172 are so disposed that the spacing between the first luminous flux LS1 and the third luminous flux LS3 after the incidence on the reflection mirrors 171 and 172 is narrower than the spacing before the incidence.

The first luminous flux LS1 and the third luminous flux LS3 enter the polarization combiner 170 with the spacing between the two luminous fluxes narrowed in the axis-Z direction. The polarization combiner 170 is formed of an optical element having a polarization separation function for blue light. In the present embodiment, the first luminous flux LS11 and the third luminous flux LS33 enter the polarization combiner 170 as P-polarized light. The first luminous flux LS11 and the third luminous flux LS33 therefore pass through the polarization combiner 170 and exit in the axis-Y direction.

The optical paths of the second luminous flux LS2 and the fourth luminous flux LS4 outputted from the second light source section 11B will be subsequently described.

In the present embodiment, the second luminous flux LS2 outputted from the second light source section 52 and the fourth luminous flux LS4 out from the fourth light source section 54 are each S-polarized light with respect to the polarization combiner 170.

The reflection mirror 173 reflects the second luminous flux LS2 outputted from the second light source section 52 in the axis-Z direction. The reflection mirror 174 reflects the fourth luminous flux LS4 outputted from the fourth light source section 54 in the axis-Z direction. Specifically, the second luminous flux LS2 is reflected off the reflection mirror 173 toward the polarization combiner 170, and the fourth luminous flux LS4 is reflected off the reflection mirror 174 toward the polarization combiner 170. The reflection mirrors 173 and 174 are each formed, for example, of a plate-shaped member provided with a film formed of a metal film or a dielectric multilayer film.

In the present embodiment, the second luminous flux LS2 and the fourth luminous flux LS4 are incident as S-polarized light on the polarization combiner 170. The second luminous flux LS2 and the fourth luminous flux LS4 are therefore reflected off the polarization combiner 170 and exit in the axis-Y direction.

In the light source apparatus 111 according to the present embodiment, the reflection mirrors 173 and 174 are so disposed that the spacing between the second luminous flux LS2 and the fourth luminous flux LS4 after the incidence on the reflection mirrors 173 and 174 is narrower than the spacing before the incidence.

The polarization combiner 170 thus combines the first luminous flux LS1, the second luminous flux LS2, the third luminous flux LS3, and the fourth luminous flux LS4 with one another to produce the combined light SL3.

Figure 11:
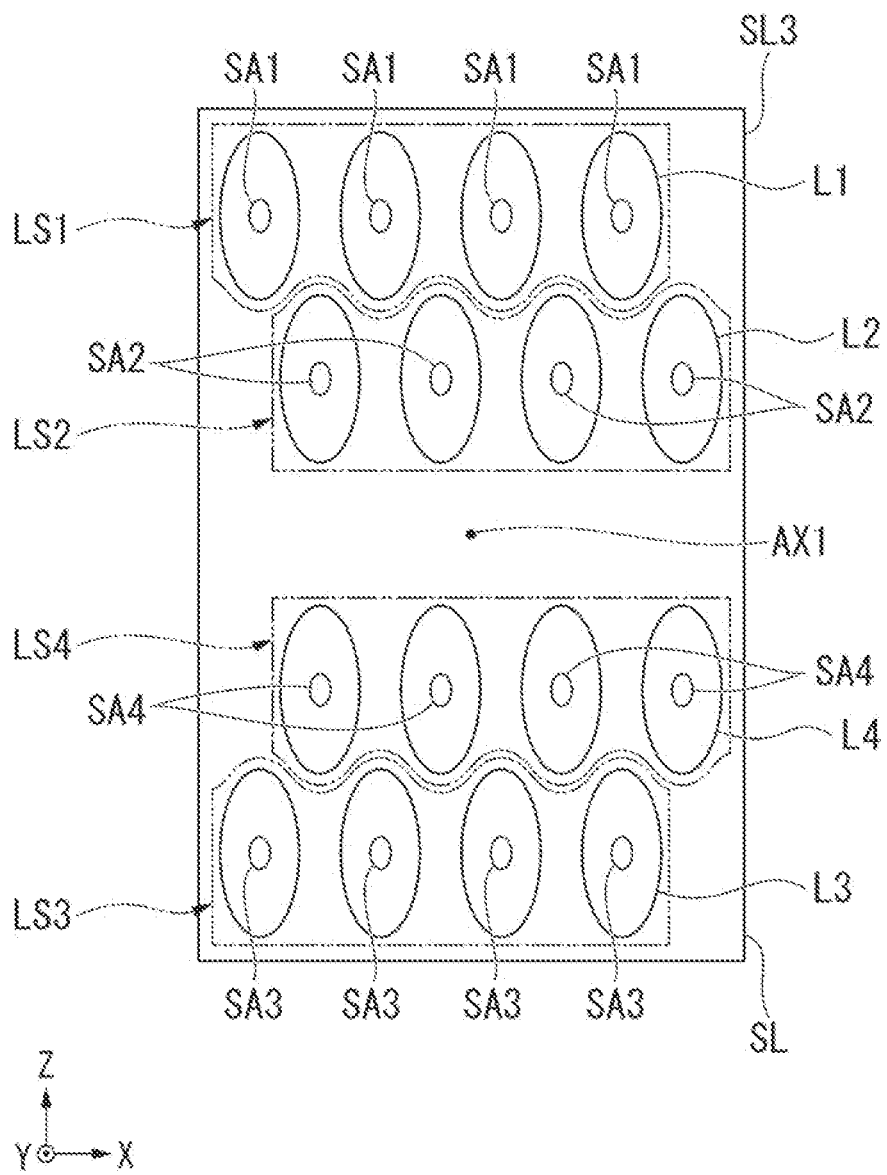
FIG. 11 conceptually shows the combined light as a result of the combination performed by a polarization combiner.

FIG. 11 conceptually shows the combined light SL3 as a result of the combination performed by the polarization combiner 170. FIG. 11 is a plan view of the combined light SL3 viewed in the direction from the side +Y toward the side −Y.

The four beams L1, which form the first luminous flux LS1, are arranged along the axis-X direction (first direction), and the four beams L3, which form the third luminous flux LS3, are arranged along the axis-X direction, as shown in FIG. 11. A cross section of each of the beams L1 and L3, the cross section perpendicular to the principal ray thereof, has an elliptical shape, and the direction of the major axis of the elliptical shape of each of the beams L1 and L3 coincides with the axis-Z direction.

The four beams L2, which form the second luminous flux LS2, are arranged along the axis-X direction (second direction), and the four beams L4, which form the fourth luminous flux LS4, are arranged along the axis-X direction. A cross section of each of the beams L2 and L4, the cross section perpendicular to the principal ray thereof, has an elliptical shape, and the direction of the major axis of the elliptical shape of each of the beams L2 and L4 coincides with the axis-Z direction.

In the combined light SL3 in the present embodiment, the beams L1, L2, L3, and L4 of the luminous fluxes LS1, LS2, LS3, and LS4 are so arranged that the directions of the major axes thereof extend along the axis-Z direction. The beams L2 and L4 of the second luminous flux LS2 and the fourth luminous flux LS4 are arranged in a row along the axis-Z direction, and the beams L1 and L3 of the first luminous flux LS1 and the third luminous flux LS3 are arranged in a row along the axis-Z direction.

In the combined light SL3 in the present embodiment, the second luminous flux LS2 and the fourth luminous flux LS4 are located in positions shifted toward the side +X from the first luminous flux LS1 and the third luminous flux LS3 in the axis-X direction. The second luminous flux LS2 and the fourth luminous flux LS4 are located between the first luminous flux LS1 and the third luminous flux LS3 in the axis-Z direction.

The beams L2 of the second luminous flux LS2 are disposed so as to be interposed between the beams L1 of the first luminous flux LS1 in the axis-X direction. The beams L2 of the second luminous flux LS2 and the beams L1 of the first luminous flux LS1 are arranged in a staggered pattern without overlapping with each other. The beams L4 of the fourth luminous flux LS4 are disposed so as to be interposed between the beams L3 of the third luminous flux LS3 in the axis-X direction. The beams L4 of the fourth luminous flux LS4 and the beams L3 of the third luminous flux LS3 are arranged in a staggered pattern without overlapping with each other.

As described above, in the light source apparatus 111 according to the present embodiment, the spacings between the beams L1, L2, L3 and L4, which form the combined light SL3, are wider than those in the combined light SL in the first embodiment, with an increase in the size of the external shape of the combined light SL3 suppressed.

Figure 12:
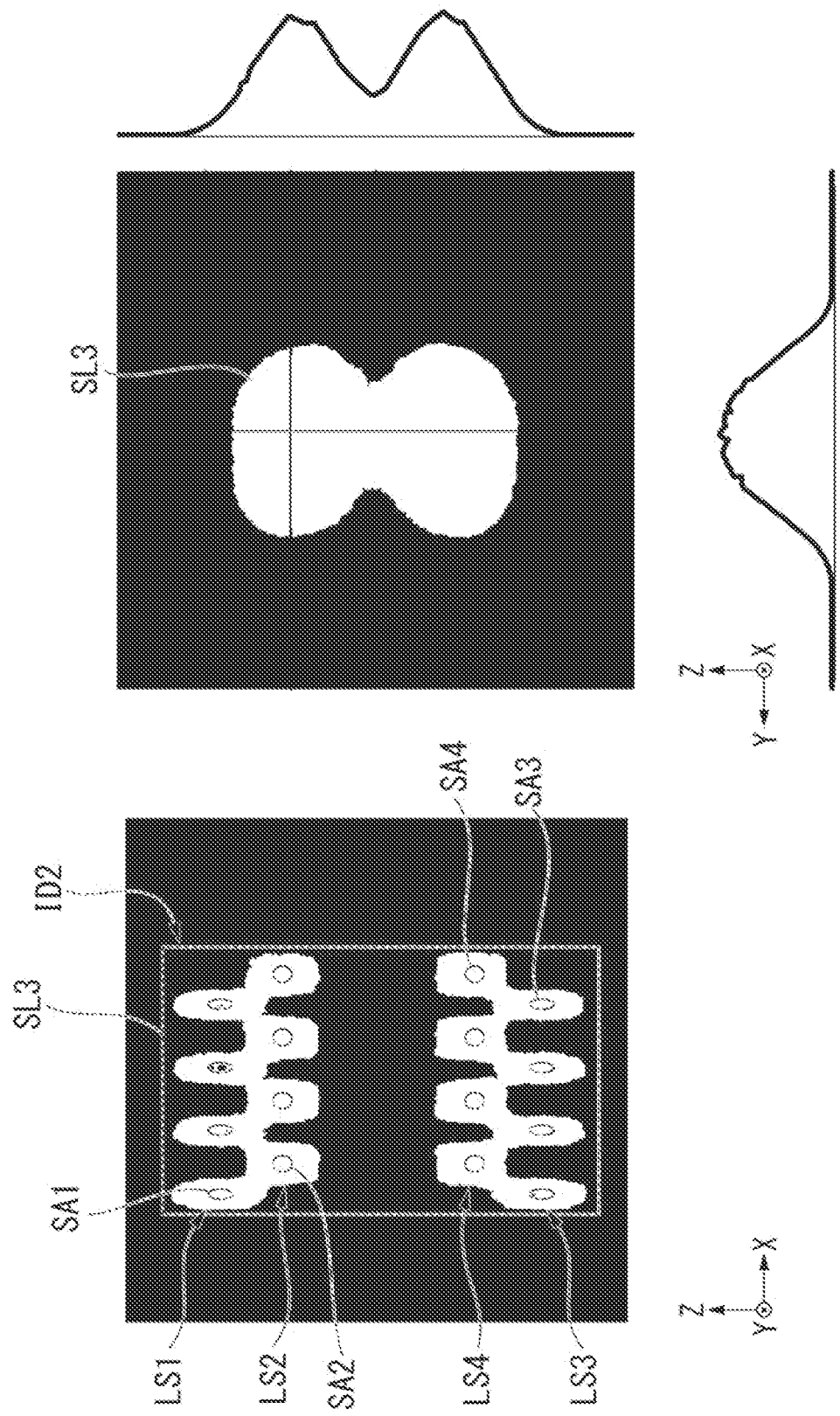
FIG. 12 shows the combined light intensity distribution of the combined light.

FIG. 12 shows the combined light intensity distribution of the combined light SL3 in present embodiment. FIG. 12 shows the illuminance distribution of the combined light SL3 at the upper surface 23a of the wavelength conversion layer 23. FIG. 12 further shows changes in the illuminance of the combined light SL3 in the axis-Y and axis-Z directions.

The combined light SL3 has a combined light intensity distribution ID2, which is the combination of the light intensity distributions of the luminous fluxes LS1, LS2, LS3, and LS4, as shown in FIG. 12. In the combined light intensity distribution ID2 of the combined light SL3, the high intensity regions SA1, SA2, SA3, and SA4 of the luminous fluxes LS1, LS2, LS3, and LS4 do not overlap with each other. The combined light SL3 in the present embodiment has a shape corresponding to the light incident openings 32K. The aspect ratio of the combined light SL3 in the present embodiment is 1:1.3.

Figure 13:
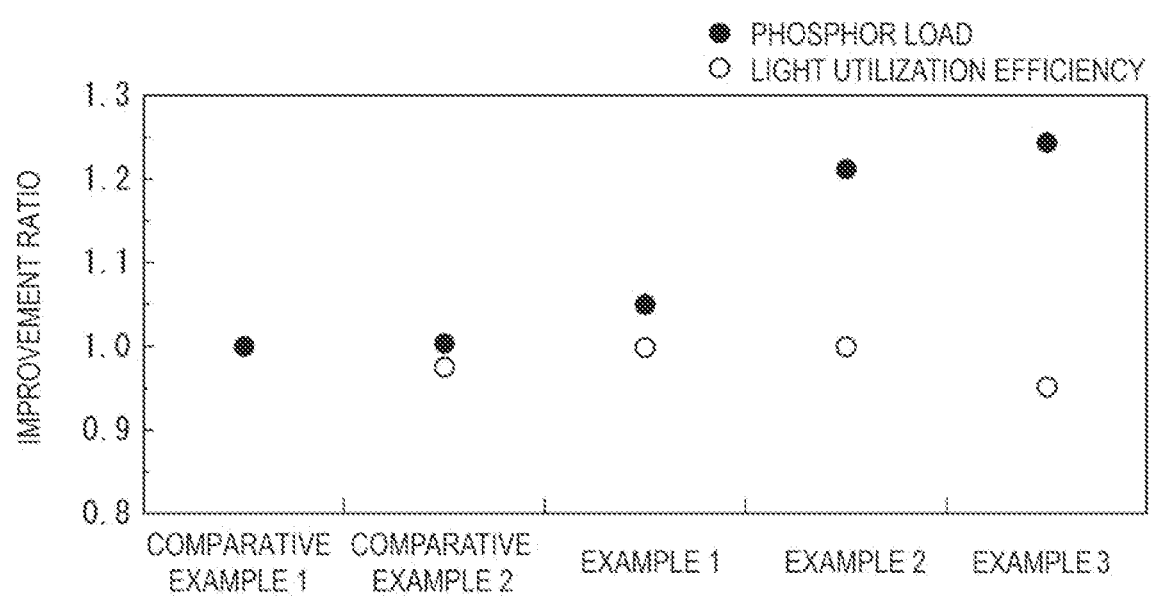
FIG. 13 shows the effect achieved when a wavelength converter is irradiated with the combined light.

FIG. 13 shows the effect achieved when the wavelength converter 15 is irradiated with the combined light SL3 in the present embodiment. FIG. 13 further shows dots corresponding to the combined light SL, SL1, and SL2 shown in FIG. 9 for convenience of the description. In FIG. 13, the combined light SL in the first embodiment is labeled with "Example 1," the combined light SL3 in the second embodiment is labeled with "Example 2," and combined light SL4 in a variation to be described later is labeled with "Example 3. Specifically, FIG. 13 shows the phosphor load acting on the wavelength conversion layer 23 when the wavelength conversion layer 23 is irradiated with the combined light SL, SL1, SL2, SL3, and SL4, and the light utilization efficiency associated with the fluorescence Y emitted from the wavelength conversion layer 23 when the wavelength conversion layer 23 is irradiated with the combined light SL, SL1, SL2, SL3, and SL4.

The light source apparatus 111 according to the present embodiment, in which the second light source section 52 and the fourth light source section 54, which along with the reflection mirrors 173 and 174 form the second light source unit 11B, are located in adjusted positions as shown in FIG. 10, can produce the combined light SL3, in which the high intensity regions SA1, SA2, SA3, and SA4 do not overlap with each other.

The light source apparatus 111 according to the present embodiment, in which the high intensity regions SA1, SA2, SA3, and SA4 of the luminous fluxes LS1, LS2, LS3, and LS4 do not overlap with each other in the combined light intensity distribution ID2, can increase the uniformity of the combined light intensity distribution ID2 of the combined light SL3.

Furthermore, in the light source apparatus 111 according to the present embodiment, the spacings between the beams L1, L2, L3, and L4, which form the combined light SL3, is wider than those in the combined light SL in the first embodiment, with an increase in the size of the external shape of the combined light SL3 suppressed.

As described above, in the combined light SL3 in the present embodiment, the spacings between the beams L1, L2, L3, and L4 are wider than those in the combined light SL in the first embodiment, so that even when the luminous flux diameter of each of the beams L1, L2, L3, and L4 is widened after the transmission through the diffuser 17, the intensity regions SA1, SA2, SA3, and SA4 do not overlap each other on the wavelength conversion layer 23. The uniformity of the light intensity distribution of the combined light SL3 in the present embodiment is higher than that of the combined light SL in the first embodiment.

It is therefore ascertained that the combined light SL3 in the present embodiment allows large reduction in the phosphor load on the wavelength conversion layer 23 as compared with the combined light SL in the first embodiment, as shown in FIG. 13.

The light source apparatus 111 according to the present embodiment, in which the shape of the combined light SL3 corresponds to the light incident openings 32K of the polarization converter 32, allows an increase in the amount of fluorescence Y passing through the polarization converter 32. The light utilization efficiency associated with the combined light SL3 in the present embodiment is comparable to that associated with the combined light SL in the first embodiment, as shown in FIG. 13. An illuminator using the light source apparatus 111 according to the present embodiment can therefore also improve the light utilization efficiency associated with the fluorescence Y while reducing the phosphor load on the wavelength conversion layer 23.

In the light source apparatus 111 according to the present embodiment, the spacings between the beams L1, L2, L3, and L4 of the luminous fluxes LS1, LS2, LS3, and LS4 can be further widened as compared with those in the combined light SL3.

Figure 14:
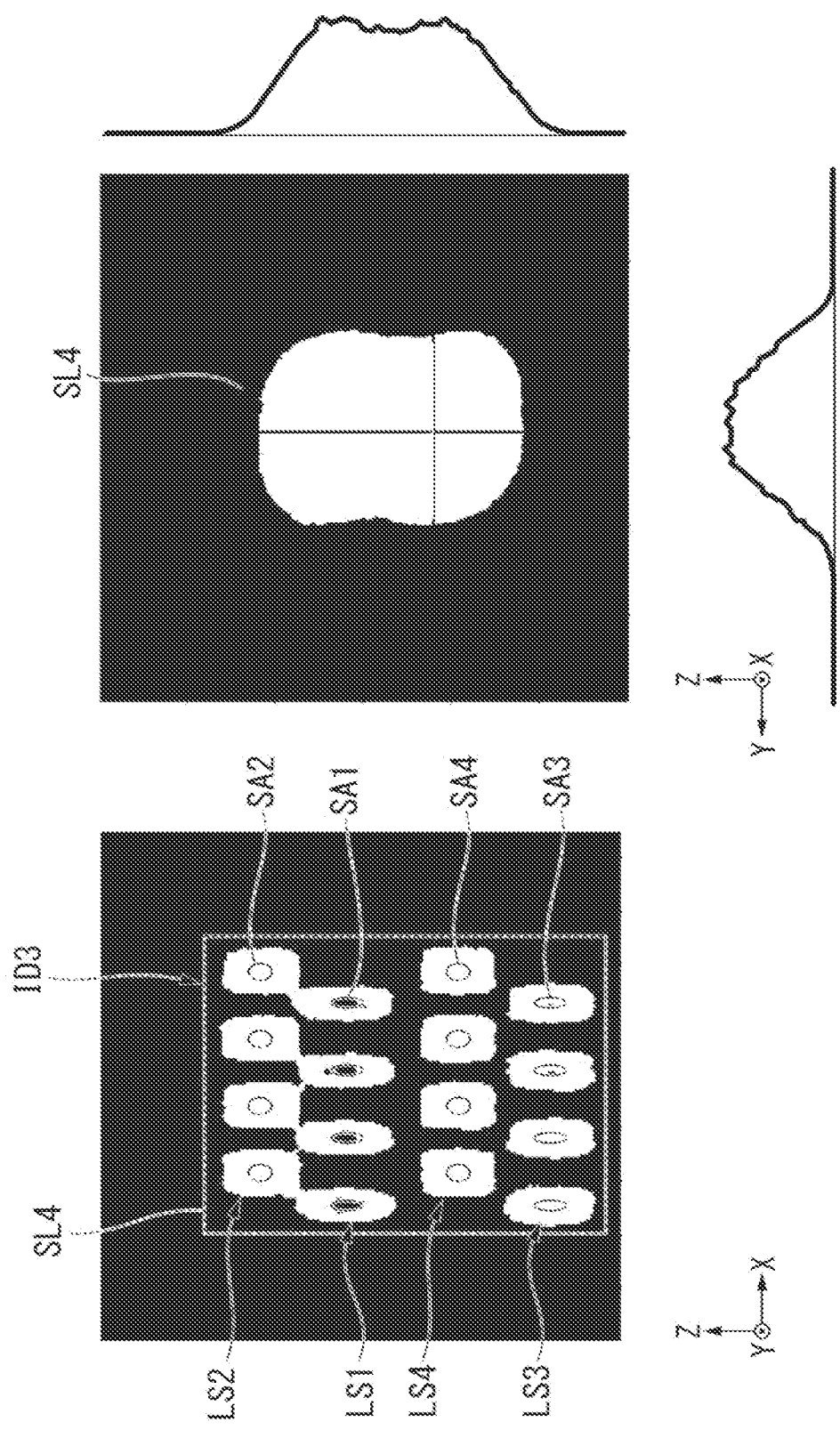
FIG. 14 shows the combined light intensity distribution of the combined light in which the spacings between beams are widened.

FIG. 14 shows the combined light intensity distribution of the combined light SL4, in which the spacings between the beams are further widened. FIG. 14 shows the illuminance distribution of the combined light SL4 at the upper surface 23a of the wavelength conversion layer 23. FIG. 14 further shows changes in the illuminance of the combined light SL4 in the axis-Y and axis-Z directions.

The combined light SL4 has a combined light intensity distribution ID3, which is the combination of the light intensity distributions of the luminous fluxes LS1, LS2, LS3, and LS4, as shown in FIG. 14. In the combined light intensity distribution ID3 of the combined light SL4, the high intensity regions SA1, SA2, SA3, and SA4 of the luminous fluxes LS1, LS2, LS3, and LS4 do not overlap with each other.

In the combined light SL4, the first luminous flux LS1 is located between the second luminous flux LS2 and the fourth luminous flux LS4 in the axes-Z direction. In the combined light SL4, the second luminous flux LS2, the first luminous flux LS1, the fourth luminous flux LS4, and the third luminous flux LS3 are sequentially arranged from the side +Z toward the side −Z. The spacing in the axis-Z direction between the beams L2 of the second luminous flux LS2 and the beams L1 of the first luminous flux LS1 in the combined light SL4 is wider than the spacing in the axis-Z direction between the beams L1 of the first luminous flux LS1 and the beams L2 of the second luminous flux LS2 in the combined light SL3. Furthermore, the spacing in the axis-Z direction between the beams L4 of the fourth luminous flux LS4 and the beams L3 of the third luminous flux LS3 in the combined light SL4 is wider than the spacing in the axis-Z direction between the beams L4 of the fourth luminous flux LS4 and the beams L3 of the third luminous flux LS3 in the combined light SL3. The aspect ratio of the combined light SL4 slightly differs from the aspect ratio of the light incident openings 32K (1:1.3).

According to the combined light SL4, in which the spacings between the beams L1, L2, L3, and L4 are widened to further increase the uniformity of the illuminance distribution on the wavelength conversion layer 23 as compared with that provided by the combined light SL3, the load on the wavelength conversion layer 23 can be further reduced. That is, it can be ascertained that the combined light SL4 can enhance the effect of reducing the load on the wavelength conversion layer 23 as compared with the combined light SL3, as indicated by the dots corresponding to Example 3 in FIG. 13.

On the other hand, since the aspect ratio of the combined light SL4 differs from the aspect ratio of the light incident openings 32K (1:1.3) as described above, the light utilization efficiency associated with the fluorescence Y achieved by the combined light SL4 is lower than that achieved by the combined light SL3, as indicated by the dots corresponding to Example 3 in FIG. 13.

The combined light SL4 exerts a smaller load on the wavelength conversion layer 23 than the combined light SL3. That is, the combined light SL4 exerts a load comparable to that exerted by the combined light SL3 on the wavelength conversion layer 23 when a larger amount of combined light SL4 is incident on the wavelength conversion layer 23. The decrease in the light utilization efficiency can therefore be compensated by increasing the amount of combined light SL4 to increase the amount of fluorescence Y emitted from the wavelength conversion layer 23. Therefore, even when the combined light SL4 is used, the same effect of reducing the phosphor load and improving the light utilization efficiency associated with the fluorescence Y as that provided by the combined light SL3 can also be achieved by increasing the amount of combined light SL4.

The technical scope of the present disclosure is not limited to the embodiments described above, and a variety of changes can be made thereto to the extent that the changes do not depart from the substance of the present disclosure.

In addition to the above, the number, arrangement, shape, material, and other specific factors of the variety of components that form the light source apparatus are not limited to those in the embodiments described above and can be changed as appropriate.

For example, in the light source apparatus 11 according to the first embodiment, the positions of the first light source unit 11A and the second light source unit 11B may be swapped. In this case, the first light source unit 11A may output P-polarized light with respect to the polarization combiner 140, and the second light source unit 11B may output S-polarized light with respect to the polarization combiner 140. In the first light source unit 11A, the positions of the first light source section 51 and the third light source section 53 may be swapped. In the second light source unit 11B, the positions of the second light source section 52 and the fourth light source section 54 may be swapped.

In the light source apparatus 111 according to the second embodiment, the positions of the first light source unit 11A and the second light source unit 11B may be swapped. In the first light source unit 11A, the positions of the first light source section 51 and the third light source section 53 may be swapped. In the second light source unit 11B, the positions of the second light source section 52 and the fourth light source section 54 may be swapped.

The aforementioned embodiments have been described with reference to the case where the four luminous fluxes LS1, LS2, LS3, and LS4 outputted from the four light source sections 51, 52, 53, and 54 are combined with one another into the combined light SL and SL3, but not necessarily in the present disclosure.

First Variation

In the present variation, the light source apparatus is formed only of the first light source section 51 and the second light source section 52.

Figure 15A:
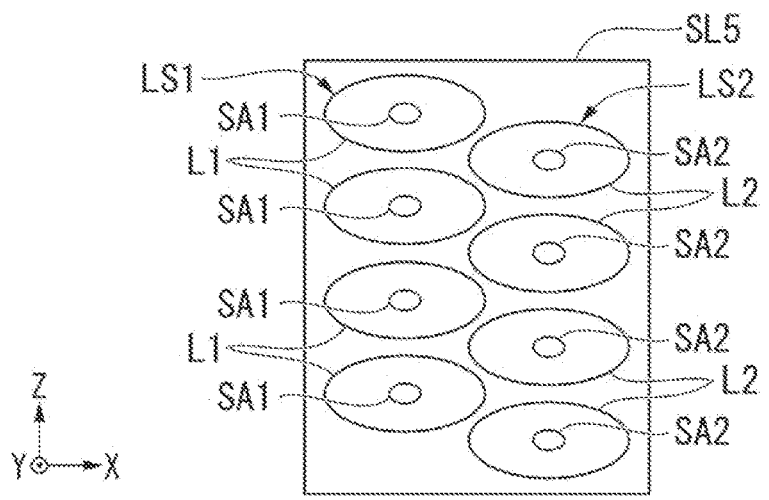
FIG. 15A conceptually shows the combined light outputted from a light source apparatus according to a first variation.

FIG. 15A conceptually shows combined light SL5 outputted from the light source apparatus according to the present variation.

The four beams L1, which form the first luminous flux LS1, are arranged along the axis-Z direction, and the four beams L2, which form the second luminous flux LS2, are arranged along the axis-Z direction, as shown in FIG. 15A. That is, the beams L1 of the first luminous flux LS1 and the beams L2 of the second luminous flux LS2 are arranged in the same direction. The direction of the minor axis of the elliptical shape of each of the beams L1 and L2 coincides with the axis-Z direction.

In the combined light SL5, the high intensity regions SA1 of the first luminous flux LS1 and the high intensity regions SA2 of the second luminous flux LS2 do not overlap with each other.

The first luminous flux LS1 and the second luminous flux LS2 are positionally shifted from each other in the axis-Z direction. The first luminous flux and the second luminous flux LS2 are so disposed that portions thereof overlap with each other in the axis-X direction. In the present variation, part of the beams L2 of the second luminous flux LS2 is interposed in the axis-X direction between the adjacent beams L1 of the first luminous flux LS1.

Also in the combined light SL5 in the present variation, since the high intensity regions SA1 and SA2 do not overlap with each other, the load on the wavelength conversion layer 23 can be reduced. Furthermore, the light utilization efficiency associated with the illumination light WL can be improved by causing the shape of the combined light SL5 to be closer to the shape of the light incident openings 32K. The light source apparatus according to the present variation, which outputs the combined light SL5, is therefore a value-added light source apparatus that provides improved light utilization efficiency associated with the fluorescence Y with the phosphor load on the wavelength conversion layer 23 reduced.

The combined light SL5 in FIG. 15A has been described with reference to the case where the beams L1 of the first luminous flux LS1 and the beams L2 of the second luminous flux LS2 are arranged in the same direction by way of example, and the first luminous flux LS1 and the second luminous flux LS2 in which the beams L1 and L2 are arranged in directions perpendicular to each other may be combined with each other.

Second Variation

In the present variation, in the first luminous flux LS1 and the second luminous flux LS2, the direction in which the beams L1 are arranged is perpendicular to the direction in which the beams L2 are arranged.

Figure 15B:
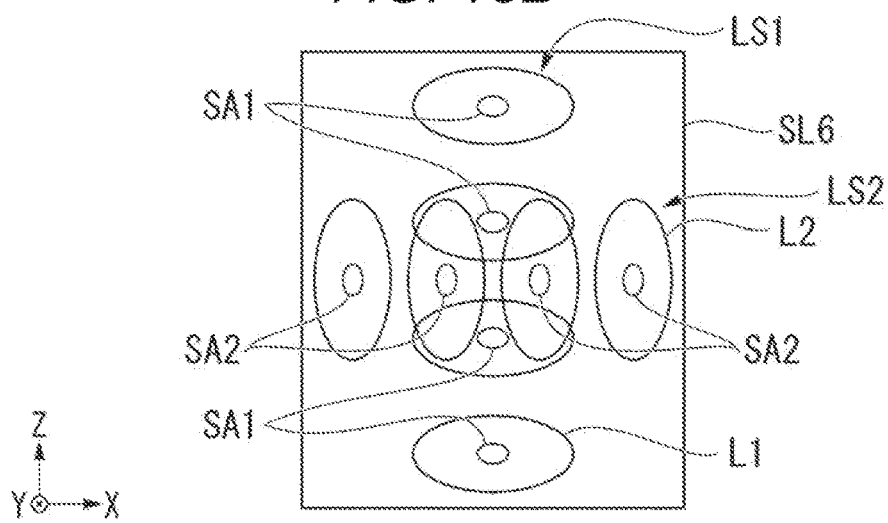
FIG. 15B conceptually shows the combined light outputted from a light source apparatus according to a second variation.

FIG. 15B conceptually shows combined light SL6 outputted from the light source apparatus according to the present variation.

The four beams L1, which form the first luminous flux LS1, are arranged along the axis-Z direction, and the four beams L2, which form the second luminous flux LS2, are arranged along the axis-X direction, as shown in FIG. 15B. That is, the beams L1 of the first luminous flux LS1 and the beams L2 of the second luminous flux LS2 are arranged in the directions perpendicular to each other. The direction of the minor axis of the elliptical shape of each of the beams L1 coincides with the axis-Z direction, and the direction of the minor axis of the elliptical shape of each of the beams L2 coincides with the axis-X direction.

The combined light SL6 in the present variation, in which the first luminous flux LS1 and the second luminous flux LS2 cross each other in the form of a crisscross, has a rectangular shape having a longitudinal direction that coincides with the axis-Z direction. The beams L1 of the first luminous flux LS1 and the beams L2 of the second luminous flux LS2 that overlap each other are so arranged that central portions of the beams do not overlap with each other. That is, the beams L1 and L2 are so arranged that the regions thereof where the light intensity is maximized do not overlap with each other.

That is, in the combined light SL6 in the present variation, the high intensity regions SA1 of the first luminous flux LS1 and the high intensity regions SA2 of the second luminous flux LS2 do not overlap with each other.

Also in the combined light SL6 in the present variation, in which the high intensity regions SA1 and SA2 do not overlap with each other, the load on the wavelength conversion layer 23 can be reduced. Furthermore, the light utilization efficiency associated with the illumination light WL can be improved by causing the shape of the combined light SL6 to be closer to the shape of the light incident openings 32K. The light source apparatus according to the present variation, which outputs the combined light SL6, is therefore a value-added light source apparatus that provides improved light utilization efficiency associated with the fluorescence Y with the phosphor load on the wavelength conversion layer 23 reduced.

Third Variation

In the present variation, the light source apparatus is formed of the first light source section 51, the second light source section 52, and the third light source section 53.

Figure 15C:
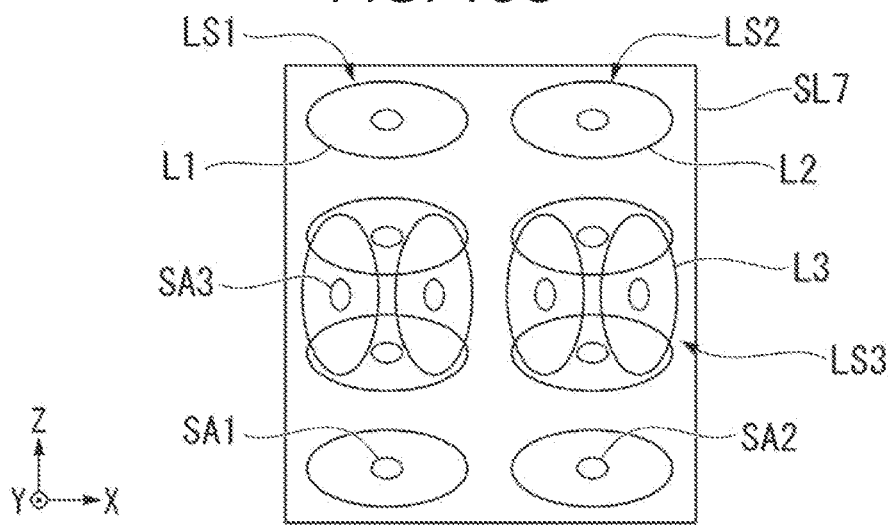
FIG. 15C conceptually shows the combined light outputted from a light source apparatus according to a third variation.

FIG. 15C conceptually shows combined light SL7 outputted from the light source apparatus according to the present variation.

The four beams L1, which form the first luminous flux LS1, are arranged along the axis-Z direction, and the four beams L2, which form the second luminous flux LS2, are arranged along the axis-Z direction, as shown in FIG. 15C. That is, the beams L1 of the first luminous flux LS1 and the beams L2 of the second luminous flux LS2 are arranged in the same direction. The direction of the minor axis of the elliptical shape of each of the beams L1 and L2 coincides with the axis-Z direction.

The four beams L3, which form the third luminous flux LS3, are arranged along the axis-X direction. The direction of the minor axis of the elliptical shape of each of the beams L3 coincides with the axis-X direction.

The direction in which the beams L1 of the first luminous flux LS1 and the beams L2 of the second luminous flux LS2 are arranged is perpendicular to the direction in which the beams L3 of the third luminous flux LS3 are arranged.

The combined light SL7 in the present variation, in which the first luminous flux LS1 and the second luminous flux LS2 cross the third luminous flux LS3 in the form of a crisscross, has a rectangular shape having a longitudinal direction that coincides with the axis-Z direction. The beams L1 of the first luminous flux LS1, the beams L2 of the second luminous flux LS2, and the beams L3 of the third luminous flux LS3 that overlap each other are so arranged that central portions of the beams do not overlap with each other. That is, the beams L1, L2, and L3 are so arranged that the regions thereof where the light intensity is maximized do not overlap with each other.

That is, in the combined light SL7 in the present variation, the high intensity regions SA1 of the first luminous flux LS1, the high intensity regions SA2 of the second luminous flux LS2, and the high intensity regions SA3 of the third luminous flux LS3 do not overlap with each other.

Also in the combined light SL7 in the present variation, in which the high intensity regions SA1, SA2, SA3 do not overlap with each other, the load on the wavelength conversion layer 23 can be reduced. Furthermore, the light utilization efficiency associated with the illumination light WL can be improved by causing the shape of the combined light SL7 to be closer to the shape of the light incident openings 32K. The light source apparatus according to the present variation, which outputs the combined light SL7, is therefore a value-added light source apparatus that provides improved light utilization efficiency associated with the fluorescence Y with the phosphor load on the wavelength conversion layer 23 reduced.

A light source apparatus according to an aspect of the present disclosure may have the configuration below.

The light source apparatus according to the aspect of the present disclosure includes a first light source section that includes a plurality of first light emitters arranged in a row along a first direction and outputs a first luminous flux, a second light source section that includes a plurality of second light emitters arranged in a row along a second direction and outputs a second luminous flux in the direction in which the first luminous flux is outputted, and a light combining member that combines the first and second luminous fluxes with each other into combined light and outputs the combined light to an irradiated region, and the combined light has a combined light intensity distribution in which a first region where the light intensity of the first luminous flux is maximized and a second region where the light intensity of the second luminous flux is maximized do not overlap with each other.

The light source apparatus according to the aspect described above may further include a third light source section that is disposed in a direction that intersects with the first direction with respect to the first light source section, includes a plurality of third light emitters arranged in a row along the first direction, and outputs a third luminous flux in the direction in which the first luminous flux is outputted, the light combining member may combine the third luminous flux with the first and second luminous fluxes to produce the combined light, and in the combined light intensity distribution of the combined light, a third region where the light intensity of the third luminous flux is maximized does not overlap with the first or second region.

In the light source apparatus according to the aspect described above, the first and second directions may intersect with each other, and the light combining member may include a first reflection member that reflects one of the first and third luminous fluxes in a direction that intersects with the first direction, a second reflection member that reflects the one of the first and third luminous fluxes, which is reflected off the first reflection member, in the direction in which the third luminous source section outputs the third luminous flux, a third reflection member that reflects the one of the first and third luminous fluxes, which is reflected off the second reflection member, and the other one of the first and third luminous fluxes, and a combiner that combines the first and third luminous fluxes reflected off the third reflection member with the second luminous flux from the second light source section.

The light source apparatus according to the aspect described above may further include a fourth light source section that is disposed in a direction that intersects with the second direction with respect to the second light source section, includes a plurality of fourth light emitters arranged in a row along the second direction, and outputs a fourth luminous flux in the direction in which the second luminous flux is outputted, the light combining member may combine the fourth luminous flux with the first, second, and third luminous fluxes to produce the combined light, and in the combined light intensity distribution of the combined light, a fourth region where the light intensity of the fourth luminous flux is maximized does not overlap with the first, second, or third region.

In the light source apparatus according to the aspect described above, the light combining member may include a fourth reflection member that reflects one of the second and fourth luminous fluxes in the direction in which the second and fourth light source sections are arranged, and a fifth reflection member that reflects the one of the second and fourth luminous fluxes, which is reflected off the fourth reflection member, in the direction in which the other one of the second and fourth luminous fluxes travels, and the combiner may combine the first and third luminous fluxes reflected off the third reflection member with the second and fourth luminous fluxes reflected off the fifth reflection member.

In the light source apparatus according to the aspect described above, in the light combining member, the first and second reflection members may reflect the first or third luminous flux in such a way that the spacing between the first and third luminous fluxes after the incidence the first and second reflection members is narrower than the spacing before the incidence, and the fourth and fifth reflection members may reflect the second or fourth luminous flux in such a way that the spacing between the second and fourth luminous fluxes after the incidence on the fourth and fifth reflection members is narrower than the spacing before the incidence.

In the light source apparatus according to the aspect described above, the light combining member may include a polarization combiner that reflects one of the first and second luminous fluxes and transmits the other one of the first and second luminous fluxes, one of the first and second luminous fluxes may be polarized in a first polarization direction with respect to the polarization combiner, and the other one of the first and second luminous fluxes may be polarized in a second polarization direction with respect to the polarization combiner but different from the first polarization direction.

In the light source apparatus according to the aspect described above, the first and second directions may be parallel to each other, and the light combining member may include a first reflection member that reflects one of the first and third luminous fluxes in a direction that intersects with the first direction, a second reflection member that reflects the one of the first and third luminous fluxes, which is reflected off the first reflection member, in the direction in which the other one of the first and third luminous fluxes travels, and a combiner that combines the one of the first and third luminous fluxes, which is reflected off the second reflection member, with the other one of the first and third luminous fluxes.

The light source apparatus according to the aspect described above may further include a fourth light source section that is disposed in a direction that intersects with the second direction with respect to the second light source section, includes a plurality of fourth light emitters arranged in a row along the second direction, and outputs a fourth luminous flux in the direction in which the second luminous flux is outputted, the light combining member may combine the fourth luminous flux with the first, second, and third luminous fluxes to produce the combined light, and in the combined light intensity distribution of the combined light, a fourth region where the light intensity of the fourth luminous flux is maximized does not overlap with the first, second, or third region.

In the light source apparatus according to the aspect described above, the light combining member may include a third reflection member that reflects the second luminous flux in the direction in which the second and fourth light source sections are arranged, and a fourth reflection member that reflects the fourth luminous flux in the direction in which the second and fourth light source sections are arranged, and the combiner may combine the second luminous flux reflected off the third reflection member, the fourth luminous flux reflected off the fourth reflection member, and the first and third luminous fluxes with one another to produce the combined light.

In the light source apparatus according to the aspect described above, in the light combining member, the first and second reflection members may reflect the first and third luminous fluxes in such a way that the spacing between the first and third luminous fluxes after the incidence the first and second reflection members is narrower than the spacing before the incidence, and the third and fourth reflection members may reflect the second and fourth luminous fluxes in such a way that the spacing between the second and fourth luminous fluxes after the incidence on the third and fourth reflection members is narrower than the spacing before the incidence.

In the light source apparatus according to the aspect described above, the light combining member may include a polarization combiner that reflects one of the first and second luminous fluxes and transmits the other one of the first and second luminous fluxes, and a phase retarder disposed in the optical path of one of the first and second luminous fluxes between the first or second light source section and the polarization combiner.

An illuminator according to another aspect of the present disclosure may have the configuration below.

The illuminator according to the other aspect of the present disclosure includes the light source apparatus according to the aspect described above, a wavelength converter that is disposed in the irradiated region irradiated with the combined light from the light source apparatus and converts the combined light in terms of wavelength, and a reflection member that reflects the combined light outputted from the light source apparatus toward the wavelength converter, and the reflection member is disposed in the optical path of the light outputted from the wavelength converter.

The illuminator according to the aspect described above may further include an optical element which is provided on a side of the reflection member, the side opposite from the wavelength converter, and on which the light outputted from the wavelength converter is incident, the optical element may have a light incident opening through which the light outputted from the wavelength converter passes, and the combined light may have a shape corresponding to the light incident opening.

The illuminator according to the aspect described above may further include a diffuser which is provided between the light source apparatus and the reflection member and on which the combined light outputted from the light source apparatus is incident.

A projector according to still another aspect of the present disclosure may have the configuration below.

The projector according to the still another aspect of the present disclosure may include the illuminator according to the aspect described above, a light modulator that modulates light from the illuminator described above in accordance with image information, and a projection optical apparatus that projects the light modulated by the light modulator described above.

What is claimed is:

1. A light source apparatus comprising:
   a first light source that includes a plurality of first light emitters arranged in a row along a first direction and emits a first luminous flux;
   a second light source that includes a plurality of second light emitters arranged in a row along a second direction and emits a second luminous flux in a direction in which the first luminous flux is emitted; and
   a combiner that combines the first luminous flux and the second luminous flux with each other to produce combined light and outputs the combined light to an irradiated region,
   wherein the combined light has a combined light intensity distribution in which a first region where a light intensity of the first luminous flux is maximized and a second region where a light intensity of the second luminous flux is maximized do not overlap with each other.

2. The light source apparatus according to claim 1, further comprising
   a third light source that is disposed in a direction that intersects with the first direction with respect to the first light source, includes a plurality of third light emitters arranged in a row along the first direction, and emits a third luminous flux in the direction in which the first luminous flux is emitted,
   wherein the combiner combines the first luminous flux, the second luminous flux, and the third luminous flux to produce the combined light, and
   in the combined light intensity distribution of the combined light, a third region where a light intensity of the third luminous flux is maximized does not overlap with the first region or the second region.

3. The light source apparatus according to claim 2, further comprising:
   a first reflector that reflects one of the first luminous flux and the third luminous flux in a direction that intersects with the first direction;
   a second reflector that reflects the one luminous flux reflected off the first reflector in a direction in which the other of the first luminous flux and the third luminous flux travels; and
   a third reflector that reflects both the one luminous flux reflected off the second reflector and the other luminous flux,
   wherein the first direction and the second directions intersect with each other, and
   the combiner combines the first luminous flux and the third luminous flux which are reflected off the third reflector with the second luminous flux emitted from the second light source.

4. The light source apparatus according to claim 3, further comprising
   a fourth light source that is disposed in a direction that intersects with the second direction with respect to the second light source, includes a plurality of fourth light emitters arranged in a row along the second direction, and emits a fourth luminous flux in a direction in which the second luminous flux is emitted,
   wherein the combiner combines the first luminous flux, the second luminous flux, the third luminous flux, and the fourth luminous flux with one another to produce the combined light, and
   in the combined light intensity distribution of the combined light, a fourth region where a light intensity of the fourth luminous flux is maximized does not overlap with the first region, the second region, or the third region.

5. The light source apparatus according to claim 4, further comprising:

a fourth reflector that reflects one of the second luminous flux and the fourth luminous flux in a direction in which the second light source and the fourth light source are arranged; and a fifth reflector that reflects the one luminous flux reflected off the fourth reflector in a direction in which the other of the second luminous flux and the fourth luminous flux travels, wherein the combiner combines the first luminous flux and the third luminous flux which are reflected off the third reflection member, the one luminous flux reflected off the fifth reflection member, and the other luminous flux.

6. The light source apparatus according to claim 5, wherein the first reflector and the second reflector are so disposed that a second distance between the one luminous flux reflected off the second reflector and the other luminous flux of the first luminous flux and the third luminous flux is smaller than a first distance between the one luminous flux incident on the first reflector and the other luminous flux of the first luminous flux and the third luminous flux, and the fourth reflector and the fifth reflector are so disposed that a fourth distance between the one luminous flux reflected off the fifth reflector and the other luminous flux of the second luminous flux and the fourth luminous flux is smaller than a third distance between the one luminous flux incident on the fourth reflector and the other luminous flux of the second luminous flux and the fourth luminous flux.

7. The light source apparatus according to claim 1, wherein the combiner is a polarization combiner that reflects a luminous flux polarized in a first polarization direction out of the first luminous flux and the second luminous flux and transmits a luminous flux polarized in a second polarization direction different from the first polarization direction out of the first luminous flux and the second luminous flux.

8. The light source apparatus according to claim 2, further comprising:

a first reflector that reflects one of the first luminous flux and the third luminous flux in a direction that intersects with the first direction; and a second reflector that reflects the one luminous flux reflected off the first reflector in a direction in which the other of the first luminous flux and the third luminous flux travels, wherein the first direction and the second directions are parallel to each other, and the combiner combines the one luminous flux reflected off the second reflector, the other luminous flux, and the second luminous flux emitted from the second light source.

9. The light source apparatus according to claim 8, further comprising a fourth light source that is disposed in a direction that intersects with the second direction with respect to the second light source, includes a plurality of fourth light emitters arranged in a row along the second direction, and emits a fourth luminous flux in a direction in which the second luminous flux is emitted, wherein the combiner combines the first luminous flux, the second luminous flux, the third luminous flux, and the fourth luminous flux with one another to produce the combined light, and in the combined light intensity distribution of the combined light, a fourth region where a light intensity of the fourth luminous flux is maximized does not overlap with the first region, the second region, or the third region.

10. The light source apparatus according to claim 9, further comprising a third reflector that reflects the second luminous flux in a direction in which the second light source and the fourth light source are arranged; and a fourth reflector that reflects the fourth luminous flux in the direction in which the second light source and the fourth light source are arranged, wherein the combiner combines the second luminous flux reflected off the third reflector, the fourth luminous flux reflected off the fourth reflector, and the first and third luminous fluxes with one another to produce the combined light.

11. The light source apparatus according to claim 10, wherein the first reflector and the second reflector are so disposed that a second distance between the one luminous flux reflected off the second reflector and the other luminous flux of the first luminous flux and the third luminous flux is smaller than a first distance between the one luminous flux incident on the first reflector and the other luminous flux of the first luminous flux and the third luminous flux, and the third reflector and the fourth reflector are so disposed that a fourth distance between the second luminous flux reflected off the second reflector and the fourth luminous flux reflected off the fourth reflector is smaller than a third distance between the second luminous flux incident on the second reflector and the fourth luminous flux incident on the fourth reflector.

12. The light source apparatus according to claim 8, further comprising a phase retarder that changes a polarization direction of a luminous flux that passes therethrough, wherein the combiner is a polarization combiner that reflects a luminous flux polarized in a first polarization direction, either the first luminous flux and the third luminous flux or the second luminous flux, and transmits a luminous flux polarized in a second polarization direction different from the first polarization direction, either the first luminous flux and the third luminous flux or the second luminous flux, and the phase retarder is disposed in an optical path extending from the first light source and the third light source to the polarization combiner.

13. The light source apparatus according to claim 8, further comprising a phase retarder that changes a polarization direction of a luminous flux that passes therethrough, wherein the combiner is a polarization combiner that reflects a luminous flux polarized in a first polarization direction, either the first luminous flux and the third luminous flux or the second luminous flux, and transmits a luminous flux polarized in a second polarization direction different from the first polarization direction, either the first luminous flux and the third luminous flux or the second luminous flux, and the phase retarder is disposed in an optical path between the second light source and the polarization combiner.

14. An illuminator comprising:

the light source apparatus according to claim 1; and a wavelength converter that is disposed in the irradiated region irradiated with the combined light from the light source apparatus and converts a wavelength of the combined light.

15. An illuminator comprising:

the light source apparatus according to claim 1;

a wavelength converter that is disposed in the irradiated region irradiated with the combined light from the light source apparatus and converts a wavelength of the combined light; and a reflector that reflects the combined light outputted from the light source apparatus toward the wavelength converter, wherein the reflector is disposed in an optical path of light outputted from the wavelength converter.

16. The illuminator according to claim 15, further comprising an optical element which is disposed on an opposite side of the reflector with respect to the wavelength converter, and on which light outputted from the wavelength converter is incident, wherein the optical element has a light incident opening through which the light outputted from the wavelength converter passes, and the combined light has a shape corresponding to the light incident opening at a cross section perpendicular to a principal ray of the combined light.

17. The illuminator according to claim 15, further comprising a diffuser which is disposed between the light source apparatus and the reflector and on which the combined light outputted from the light source apparatus is incident.

18. A projector comprising:

the illuminator according to claim 14;

a light modulator that modulates light outputted from the illuminator; and a projection optical apparatus that projects the light modulated by the light modulator.

19. A projector comprising:

the illuminator according to claim 15;

a light modulator that modulates light outputted from the illuminator; and a projection optical apparatus that projects the light modulated by the light modulator.

* * * * *